United States Patent
Tsujimoto et al.

(10) Patent No.: US 8,353,151 B2
(45) Date of Patent: Jan. 15, 2013

(54) EXHAUST GAS CONTROL APPARATUS FOR INTERNAL COMBUSTION ENGINE

(75) Inventors: Kenichi Tsujimoto, Susono (JP); Mikio Inoue, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 158 days.

(21) Appl. No.: 12/921,045

(22) PCT Filed: Sep. 3, 2009

(86) PCT No.: PCT/IB2009/006731
§ 371 (c)(1), (2), (4) Date: Sep. 3, 2010

(87) PCT Pub. No.: WO2010/026466
PCT Pub. Date: Mar. 11, 2010

(65) Prior Publication Data
US 2011/0011063 A1    Jan. 20, 2011

(30) Foreign Application Priority Data
Sep. 4, 2008    (JP) ................................. 2008-227512

(51) Int. Cl.
*F01N 3/00*    (2006.01)
(52) U.S. Cl. ................. 60/286; 60/300; 60/303
(58) Field of Classification Search .......... 60/285, 60/286, 299, 300, 303
See application file for complete search history.

(56) References Cited

U.S. PATENT DOCUMENTS

| | | | |
|---|---|---|---|
| 3,791,143 A * | 2/1974 | Keith et al. ............... | 60/274 |
| 4,510,749 A | 4/1985 | Taguchi et al. | |
| 5,419,121 A | 5/1995 | Sung et al. | |
| 5,611,198 A * | 3/1997 | Lane et al. .............. | 60/299 |
| 5,711,149 A | 1/1998 | Araki | |
| 5,771,683 A * | 6/1998 | Webb ...................... | 60/274 |
| 6,318,077 B1 * | 11/2001 | Claypole et al. ........ | 60/303 |
| 7,685,813 B2 * | 3/2010 | McCarthy, Jr. .......... | 60/295 |
| 8,268,273 B2 * | 9/2012 | Doring .................... | 423/212 |
| 2006/0021332 A1 | 2/2006 | Gaiser | |

FOREIGN PATENT DOCUMENTS

| JP | A-8-509044 | 9/1996 |
|---|---|---|
| WO | WO 2008/081153 A1 | 7/2008 |

OTHER PUBLICATIONS

International Search Report issued in International Application No. PCT/IB2009/006731, dated Dec. 13, 2009.
Written Opinion of the International Searching Authority in International Application No. PCT/IB2009/006731, dated Dec. 13, 2009.

\* cited by examiner

*Primary Examiner* — Binh Q Tran
(74) *Attorney, Agent, or Firm* — Oliff & Berridge, PLC

(57) ABSTRACT

An exhaust gas control apparatus includes an oxidation catalyst, a compact oxidation catalyst having a smaller cross section than that of an engine exhaust passage, a fuel supply valve, a glow plug, and an electronic control unit. The control modes for the exhaust gas control apparatus include a first control mode where the fuel is supplied from the fuel supply valve, heated by the glow plug, and ignited, a second control mode where the fuel is supplied from the fuel supply valve, and heated by the glow plug but is not ignited, and a third control mode where the fuel is supplied from the fuel supply valve and the glow plug does not provide heating. The electronic control unit selects the first or third control mode in the operation region where ignition is possible, and selects the second or third control mode in the operation region where ignition is not possible.

10 Claims, 14 Drawing Sheets

EXHAUST GAS CONTROL APPARATUS FOR INTERNAL COMBUSTION ENGINE

BACKGROUND OF THE INVENTION

1. Field of the Invention

The invention relates to an exhaust gas control apparatus for an internal combustion engine.

2. Description of the Related Art

In internal combustion engines such as diesel engines and gasoline engines, fuel is burned in an engine body, and exhaust gas that contains pollutants is discharged from the engine body. Examples of noxious pollutants include carbon monoxide (CO), unburned hydrocarbon (HC), nitrogen oxide (NOx) and particulate matter (PM).

The internal combustion engine is provided with an exhaust gas processing device that purifies the exhaust gas. Examples of the exhaust gas processing device include an oxidation catalyst that oxidizes carbon monoxide, etc., a NOx storage catalyst that removes nitrogen oxide, and a particulate filter that removes particulate matter.

Published Japanese Translation of PCT application No 8-509044 describes an apparatus that decreases the pollutants that are emitted from an automobile engine. This apparatus includes a fuel supply device and a fuel line that is controlled by a valve used to supply low ignition temperature fuel into an exhaust gas discharge line connected to the engine. The apparatus is provided with an air pump, and the air pump supplies combustion air into the exhaust gas discharge line through an air line.

In the apparatus, particulate pollutants in the exhaust gas flow are burned in an exhaust pipe at a position upstream of a particulate filter that removes the particulate pollutants. As a result, the useful life of the particulate filter is prolonged.

An exhaust gas processing device fulfills its function when an appropriate operating condition, for example, a condition for the temperature or a condition for the amount of reductant is satisfied. When the exhaust gas discharged from the internal combustion engine needs to be purified, the operating conditions should be satisfied in a short time.

In the apparatus described in Published Japanese Translation of PCT application No. 8-509044, a flame is provided in the exhaust pipe to heat a catalyst provided downstream of the position where the flame is provided. In this apparatus, in order to provide a flame, the air is introduced into the exhaust pipe through the air line to supply oxygen into the exhaust pipe. When the air is not introduced into the exhaust pipe through the air line, if the oxygen concentration in the exhaust gas is high, it is possible to provide a flame. However, if the oxygen concentration in the exhaust gas is low, it is not possible to provide a flame. If it is not possible to provide a flame in the exhaust pipe, the temperature of the catalyst provided downstream of the position where a flame is supposed to be provided is not increased in a short time. As a result, it may take a long time to satisfy the appropriate operating condition for the catalyst.

When a flame is not provided in the exhaust pipe, if, for example, the temperature of an oxidation catalyst is lower than the activation temperature, the oxidation catalyst may be heated by the exhaust gas to achieve the activation temperature. However, preferably, the temperature of the oxidation catalyst is increased in a shorter time. If the temperature of the oxidation catalyst is equal to or higher than the activation temperature, the temperature of the oxidation catalyst may be increased by the heat that is generated by oxidation reaction, which occurs in the oxidation catalyst using the reductant contained in the exhaust gas. In this case as well, preferably, a larger amount of reductant is supplied to the oxidation catalyst to increase the temperature of the oxidation catalyst in a shorter time.

SUMMARY OF THE INVENTION

The invention provides an exhaust gas control apparatus for an internal combustion engine that achieves an operation condition appropriate for an exhaust gas processing device in a short time based on the state of the exhaust gas and the state of the exhaust gas processing device.

A first aspect of the invention relates to an exhaust gas control apparatus for an internal combustion engine, which includes: an exhaust gas processing device that is provided in an engine exhaust passage, and that purifies exhaust gas; a compact oxidation catalyst which is provided in the engine exhaust passage at a position upstream of the exhaust gas processing device, which has a cross section that is smaller than a cross section of the engine exhaust passage, and in which part of the exhaust gas flows; a fuel supply device that supplies fuel toward the compact oxidation catalyst; a heating device that is provided between the compact oxidation catalyst and the fuel supply device and that provides heating; and a control unit that controls the fuel supply device and the heating device. There are a first operation region where it is possible to ignite the fuel when the fuel is supplied into the exhaust gas by the fuel supply device and the fuel is heated by the heating device, and a second operation region where it is not possible to ignite the fuel when the fuel is supplied into the exhaust gas by the fuel supply device and the fuel is heated by the heating device. Control modes for the exhaust gas control apparatus include a first control mode where the fuel is supplied from the fuel supply device, the fuel is heated by the heating device, and the fuel is ignited, a second control mode where the fuel is supplied from the fuel supply device, the fuel is heated by the heating device, and the fuel is not ignited, and a third control mode where the fuel is supplied from the fuel supply device and the heating device does not provide heating. The control unit places the exhaust gas control apparatus in the first control mode or the third control mode in the first operation region, and places the exhaust gas control apparatus in the second control mode or the third control mode in the second operation region. With this configuration, it is possible to select the control mode from among the first control mode, the second control mode and the third control mode based on the state of the exhaust gas and the state of the exhaust gas processing device. Therefore, it is possible to achieve the operation condition appropriate for the exhaust gas processing device in a short time.

In the aspect described above, the exhaust gas control apparatus may be formed in such a manner that part of a flame that is provided when the fuel is ignited travels through a space between the compact oxidation catalyst and a wall face of the engine exhaust passage. With this configuration, it is possible to provide a flame at a position downstream of the compact oxidation catalyst. In addition, the thermal stress in the compact oxidation catalyst is decreased, and therefore the thermal resistance of the compact oxidation catalyst improves.

In the aspect described above, the control unit may control the fuel supply device in such a manner that the fuel supply device supplies the fuel in a first fuel supply amount during a predetermined period after an operation in the first control mode is started and the fuel supply device supplies the fuel in a second fuel supply amount that is smaller than the first fuel supply amount after the predetermined period has elapsed. With this configuration, it is possible to ignite the fuel stably in the first control mode.

In the aspect described above, when the control mode is switched from the first control mode to the third control mode, the control unit may set a period in which the heating device does not provide heating and the fuel supply device does not supply the fuel between the ending time of the first control mode and the starting time of the third control mode. With this configuration, it is possible to suppress breakage of the compact oxidation catalyst due to abrupt cooling of the compact oxidation catalyst.

In the aspect described above, there may be provided an exhaust gas flow rate adjustment device that adjusts the flow rate of the exhaust gas which flows in the engine exhaust passage and that is controlled by the control unit. The control unit may control the exhaust gas flow rate adjustment device in such a manner that the exhaust gas is supplied at a first flow rate during a predetermined period after an operation in the first control mode is started, and the exhaust gas is supplied at a second flow rate that is higher than the first flow rate after the predetermined period has elapsed. With this configuration, it is possible to ignite the fuel stably.

In the aspect described above, when the exhaust gas control apparatus is operated in the first control mode, the control unit may control the fuel supply device in such a manner that if the temperature of the compact oxidation catalyst is equal to or higher than a predetermined threshold temperature, the fuel supply device supplies the fuel in an amount that is larger than an amount of fuel that is supplied from the fuel supply device when the temperature of the compact oxidation catalyst is lower than the predetermined threshold temperature. With this configuration, it is possible to supply a large amount of reductant to the exhaust gas processing device provided downstream of the compact oxidation catalyst.

In the aspect described above, the exhaust gas processing device may include at least one of an oxidation catalyst, a NOx storage catalyst and a particulate filter.

The exhaust gas control apparatus for an internal combustion engine according to the aspect described above achieves an operation condition appropriate for the exhaust gas processing device in a short time based on the state of the exhaust gas and the state of the exhaust gas processing device.

BRIEF DESCRIPTION OF THE DRAWINGS

The features, advantages and technical and industrial significance of this invention will be described in the following detailed description of example embodiments of the invention with reference to the accompanying drawings, in which like numerals denote like elements, and wherein.

DETAILED DESCRIPTION OF THE EMBODIMENTS

An exhaust gas control apparatus for an internal combustion engine according to a first embodiment of the invention will be described with reference to FIG. 1 to FIG. 12.

Figure 1:
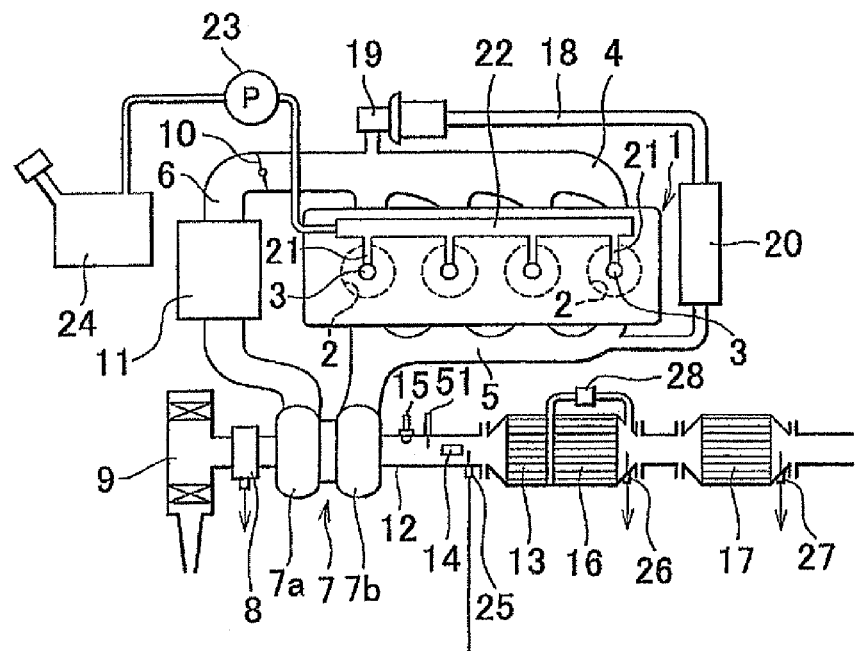
FIG. 1 is an overall view showing a compression ignition internal combustion engine.
Figure 1:
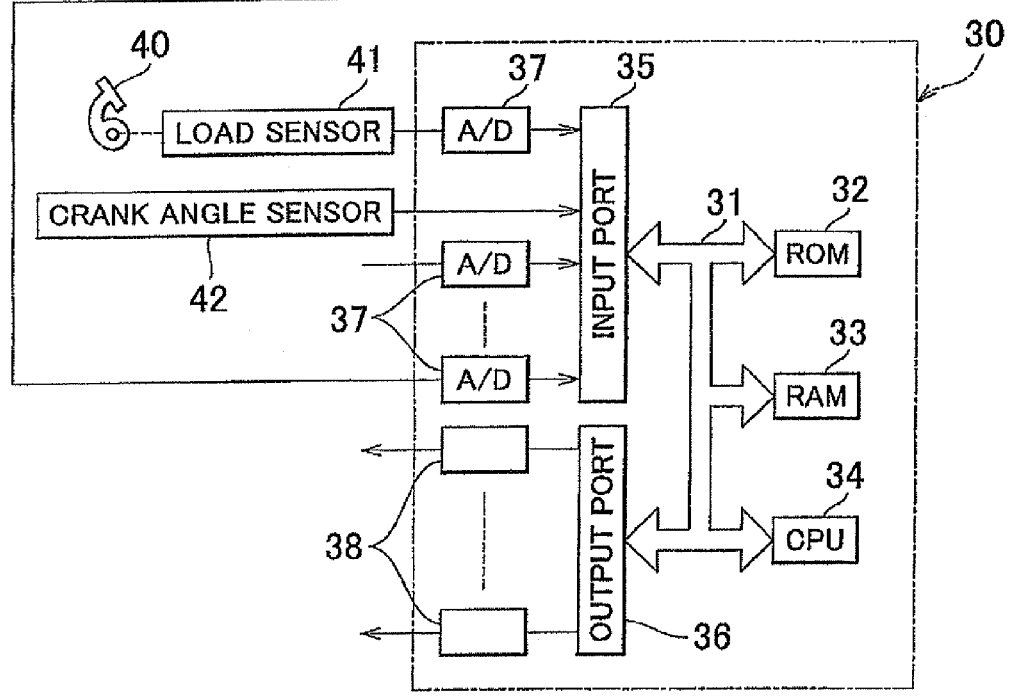

FIG. 1 is an overall view showing a compression ignition internal combustion engine in the first embodiment of the invention. The first embodiment will be described on the assumption that the internal combustion engine is a diesel engine. The internal combustion engine includes an engine body 1. The engine body 1 includes combustion chambers 2 formed in respective cylinders, electronically-controlled fuel injection valves 3 that inject fuel into the respective cylinders 2, an intake manifold 4, and an exhaust manifold 5.

The intake manifold 4 is connected to the outlet of a compressor 7a of an exhaust turbocharger 7 via an intake duct 6. The inlet of the compressor 7a is connected to an air cleaner 9 via an intake air amount detector 8. A throttle valve 10 that is driven by a step motor is provided in the intake duct 6, and a cooling device 11 that cools the intake air flowing through the intake duct 6 is provided around the intake duct 6. In the embodiment shown in FIG. 1, an engine coolant is introduced into the cooling device 11, and the engine coolant cools the intake air.

The exhaust manifold 5 is connected to the inlet of an exhaust turbine 7b of the exhaust turbocharger 7. The outlet of the exhaust turbine 7b is connected to an oxidation catalyst 13, which serves as an exhaust gas purification catalyst, via an exhaust pipe 12. A particulate filter 16, which traps particulate matter in the exhaust gas, is provided in an engine exhaust passage at a position downstream of the oxidation catalyst 13. In the embodiment shown in FIG. 1, a NOx storage catalyst 17 is provided in the engine exhaust passage at a position downstream of the particulate filter 16. The oxidation catalyst 13, the particulate filter 16 and the NOx storage catalyst 17 serve as exhaust gas processing devices.

A compact oxidation catalyst 14 that is smaller in volume than the oxidation catalyst 13 is provided in the engine exhaust passage at a position upstream of the oxidation catalyst 13, that is, in the exhaust pipe 12. Part of the exhaust, which will flow into the oxidation catalyst 13, flows into the compact oxidation catalyst 14. A fuel supply valve 15, which serves as a fuel supply device that supplies the fuel toward the compact oxidation catalyst 14, is provided in the engine exhaust passage at a position upstream of the compact oxidation catalyst 14, that is, in the exhaust pipe 12. The fuel supply valve 15 has a function of supplying the fuel and stopping the fuel supply. A glow plug 51 is provided between the fuel supply valve 15 and the compact oxidation catalyst 14. The glow plug 51 serves as a heating device that has a function of heating its ambient area and stopping the heating. The glow plug 51 is formed so that the fuel injected from the fuel supply valve 15 is ignited in the later-described operation region where it is possible to ignite the fuel.

An EGR passage 18, through which the exhaust gas is recirculated back to the combustion chambers 2, is formed between the exhaust manifold 5 and the intake manifold 4. An electronically-controlled EGR control valve 19 is provided in the EGR passage 18. A cooling device 20, which cools the EGR gas flowing through the EGR passage 18, is provided around the EGR passage 18. In the embodiment shown in FIG. 1, the engine coolant is introduced into the cooling device 20, the engine coolant cools the EGR gas.

The fuel injection valves 3 are connected to a common rail 22 via respective fuel supply pipes 21. The common rail 22 is connected to a fuel tank 24 via an electronically-controlled variable delivery fuel pump 23. The fuel stored in the fuel tank 24 is supplied into the common rail 22 by the fuel pump 23. The fuel supplied into the common rail 22 is supplied to the fuel injection valves 3 through the respective fuel supply pipes 21.

An electronic control unit 30 is formed of a digital computer. The electronic control unit 30 in the first embodiment serves as a control unit for the exhaust gas control apparatus. The electronic control unit 30 includes a ROM (Read Only Memory) 32, a RAM (Random Access Memory) 33, a CPU (microprocessor) 34, an input port 35, and an output 36, which are connected to each other by a bi-directional bus 31.

A temperature sensor 25 that detects the temperature of the compact oxidation catalyst 14 is provided downstream of the compact oxidation catalyst 14. A temperature sensor 26 that detects the temperature of the oxidation catalyst 13 or the particulate filter 16 is provided downstream of the particulate filter 16. A temperature sensor 27 that detects the temperature of the NOx storage catalyst 17 is provided downstream of the NOx storage catalyst 17. Signals output from the temperature sensors 25, 26 and 27 are input in the input port 35 via respective A/D converters 37.

The particulate filter 16 is provided with a pressure difference sensor 28 that detects the pressure difference between the upstream side and the downstream side of the particulate filter 16. Signals output from the pressure difference sensor 28 and the intake air amount detector 8 are input in the input port 35 via the respective A/D converters 37. A load sensor 41 that generates an output voltage that is proportional to the depression amount L of an accelerator pedal 40 is connected to the accelerator pedal 40. The output voltage from the load sensor 41 is input in the input port 35 via the corresponding A/D converter 37. A crank angle sensor 42 that generates an output pulse each time a crankshaft rotates, for example, 15 degrees is connected to the input port 35. The output port 36 is connected to the fuel injection valves 3, a step motor that drives the throttle valve 10, the EGR control valve 19, and the fuel pump 23 via respective drive circuits 38. In addition, the output port 36 is connected to the fuel supply valve 15 and the glow plug 51 via the respective drive circuits 38.

Figure 2A:
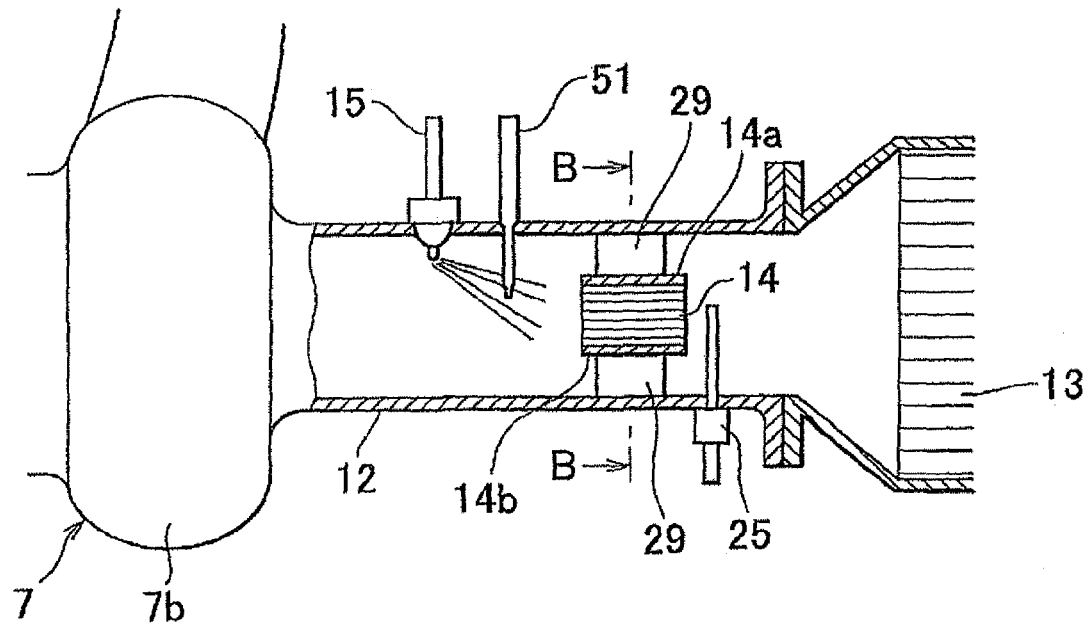
FIG. 2A is a cross-sectional view schematically showing a portion of an exhaust gas control apparatus, in which a compact oxidation catalyst is provided.
Figure 2B:
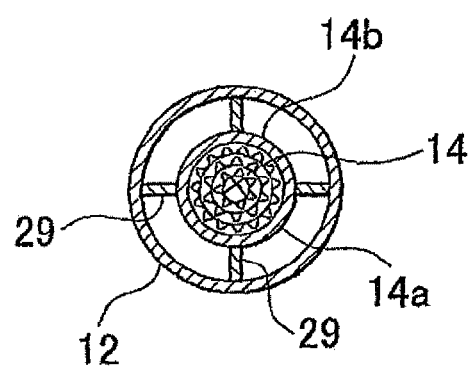
FIG. 2B is a cross-sectional view of the compact oxidation catalyst taken along the line B-B in FIG. 2A.

FIG. 2A is an enlarged cross-sectional view schematically showing a portion near the compact oxidation catalyst in the exhaust pipe. FIG. 2B is a cross-sectional view schematically showing the compact oxidation catalyst taken along the line B-B in FIG. 2A.

As shown in FIG. 2A, the exhaust pipe 12 has a cylindrical shape. The fuel supply valve is provided so as to supply the fuel toward the upstream-side end face of the compact oxidation catalyst 14. The fuel supply valve 15 has an injection orifice, and the injection orifice faces the end face of the compact oxidation catalyst 14. The injection orifice of the fuel supply valve 15 in the first embodiment is formed in such a manner that the fuel is injected in a radial fashion. The exhaust gas control apparatus according to the first embodiment is formed in such a manner that light oil used as the fuel for the engine body 1 is injected from the fuel supply valve 15. The fuel injected from the fuel supply valve 15 is not limited to the light oil for the engine body 1. The fuel that differs from the fuel for the engine body 1 may be injected from the fuel supply valve 15.

The glow plug 51 is arranged in such a manner that the fuel supplied from the fuel supply valve 15 is heated. The glow plug 51 is formed in such a manner that the temperature of the end portion is increased. The glow plug 51 is provided at such a position that the end portion contacts the fuel injected from the fuel supply valve 15.

The glow plug 51 and the fuel supply valve 15 in the first embodiment are rod-shaped members. The glow plug 51 and the fuel supply valve 15 are inserted into the exhaust pipe 12 through the wall in a predetermined direction. The shapes and positions of the glow plug 51 and the fuel supply valve 15 may be appropriately selected.

In the apparatus shown in FIG. 2A and FIG. 2B, the compact oxidation catalyst 14 has a base body that is a laminated structure with thin metal plates and thin metal corrugation plates. On the surface of the base body of the compact oxidation catalyst 14, a catalyst carrier layer made of, for example, alumina is formed. A noble metal catalyst, for example, platinum Pt, rhodium Rd or palladium Pd is carried on the catalyst carrier. The base body may be made of cordierite. The compact oxidation catalyst 14 is arranged within a cylindrical outer frame 14a. The cylindrical outer frame 14a is supported by the exhaust pipe 12 via multiple stays 29.

The compact oxidation catalyst 14 has a cross section that is smaller than the entire flow passage area for the exhaust gas that flows toward the oxidation catalyst 13. That is, the cross section of the compact oxidation catalyst 14 is smaller than the cross section of the exhaust pipe 12. The compact oxidation catalyst 14 is a cylindrical member that is provided at substantially the center of the exhaust pipe 12 and that extends in the direction of exhaust gas flow. A passage through which the exhaust gas flows is formed around the compact oxidation catalyst 14.

The oxidation catalyst 13 is an exhaust gas purification-oxidation catalyst that is larger in volume than the compact oxidation catalyst 14. The oxidation catalyst 13 includes, for example, a base body that has partition walls, which are arranged within a cylindrical case body and which extend in the direction of exhaust gas flow. The base body has, for example, a honeycomb structure. A coat layer formed of, for example, porous oxide powder is formed of the surface of the base body, and a noble metal catalyst, for example, platinum Pt is carried on the coat layer.

As shown in FIG. 2A, in the exhaust gas control apparatus for an internal combustion engine according to the first embodiment, a flame may be provided by heating the fuel injected from the fuel supply valve 15 with the use of the glow plug 51. Whether it is possible to provide a flame depends on the atmosphere in the exhaust pipe 12. That is, the operation region is divided into an operation region where it is possible to ignite the fuel and an operation region where it is not possible to ignite the fuel based on the state of exhaust gas discharged from the engine body. Whether it is possible to provide a flame depends on, for example, the oxygen concentration in the exhaust gas and the exhaust gas flow rate Ga.

Figure 3:
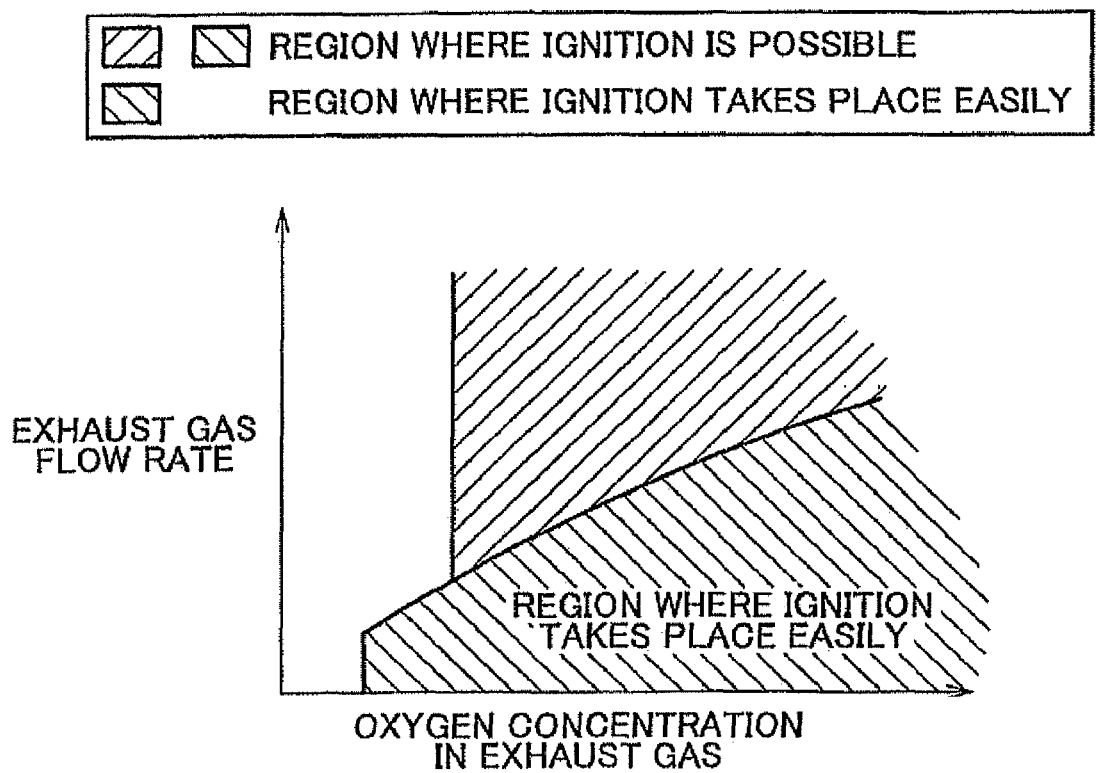
FIG. 3 is a graph showing a region where it is possible to ignite the fuel supplied from a fuel supply valve.

FIG. 3 is a graph showing the region where it is possible to ignite the fuel injected from the fuel supply valve. The abscissa axis represents the oxygen concentration in the exhaust gas, and the ordinate axis represents the exhaust gas flow rate. If the oxygen concentration in the exhaust gas is equal to or higher than a value at which it is possible to ignite the fuel, the fuel injected from the fuel supply valve is ignited. As the oxygen concentration in the exhaust gas increases, the fuel is ignited more easily. In contrast, as the exhaust gas flow rate decreases, the fuel is ignited more easily. The region where it is possible to ignite the fuel is defined as shown in FIG. 3. In addition, the region where it is possible to ignite the fuel easily is defined within the region where it is possible to ignite the fuel.

The exhaust gas control apparatus according to the first embodiment shown in FIG. 1 may be operated in a first control mode where the fuel is injected from the fuel supply valve 15, and the fuel is heated by the glow plug 51 and ignited to provide a flame. The exhaust gas control apparatus may be operated in a second control mode where the fuel is injected from the fuel supply valve 15 and the fuel is heated by the glow plug 51 but the fuel is not ignited. The exhaust gas control apparatus may be operated in a third control mode where the fuel is supplied from the fuel supply valve 15 and heating of the fuel with the use of the glow plug 51 is stopped. The exhaust gas control apparatus may be operated in a fourth control mode where the fuel is not supplied from the fuel supply valve 15 and electricity is supplied to the glow plug 51.

The electronic control unit 30 according to the first embodiment places the exhaust gas control apparatus in the first control mode or the third control mode when the exhaust gas state is in the operation region where it is possible to ignite the fuel. When the exhaust gas state is in the operation region where it is not possible to ignite the fuel, the electronic control unit 30 places the exhaust gas control apparatus in the second control mode or the third control mode.

Hereafter, description will be provided concerning the control modes showing the examples of operation of the exhaust gas control apparatus for an internal combustion engine according to the first embodiment. In the first embodiment, the electronic control unit 30 achieves each control mode. That is, the electronic control unit 30 controls the fuel supply valve 15, the glow plug 51, the EGR control valve 19, etc.

Figure 4:
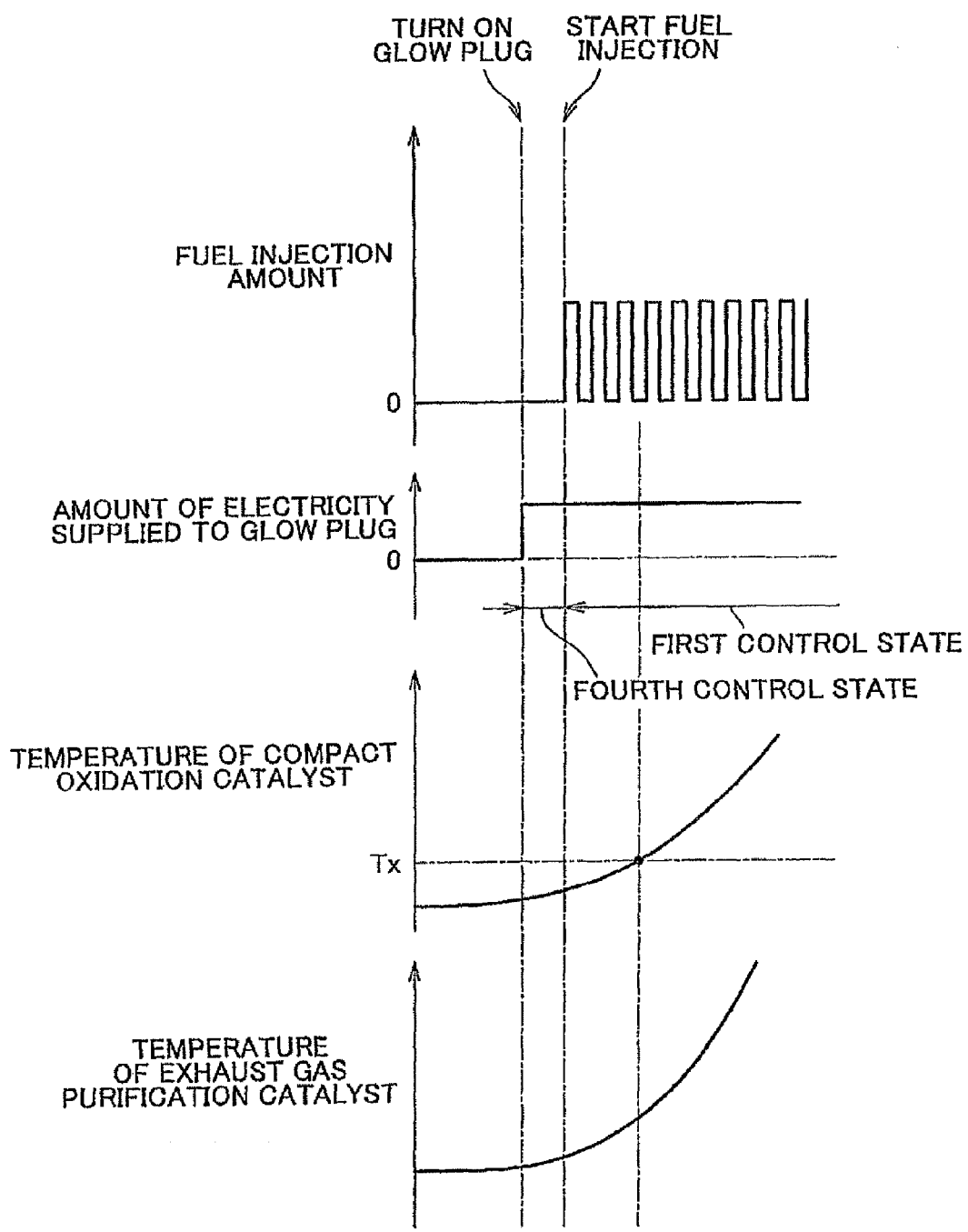
FIG. 4 is a time chart illustrating a first control mode in a first embodiment of the invention.

FIG. 4 is a time chart illustrating the first control mode. In this operation example, the exhaust gas control apparatus is operated in the first control mode so that the temperature of the oxidation catalyst 13 provided downstream of the compact oxidation catalyst 14 is increased. In the exhaust gas control apparatus, a flame is provided to heat the exhaust gas processing devices. In the initial state, the temperature of the compact oxidation catalyst 14 is lower than the activation temperature Tx. That is, the compact oxidation catalyst 14 has not been activated. However, the exhaust gas control apparatus is operated in the operation region where it is possible to ignite the fuel. Therefore, in the atmosphere in the exhaust pipe 12, it is possible to ignite the fuel.

As shown in FIGS. 2A and 4, first, electricity is supplied to the glow plug 51 without injecting the fuel from the fuel supply valve 15. That is, the exhaust gas control apparatus is operated in the fourth control mode. The exhaust gas control apparatus is operated in the fourth control mode mainly to increase the temperature of the glow plug 51. If electricity is supplied to the glow plug 51, the glow plug 51 is turned on and the temperature of the end portion of the glow plug 51 is increased. Even in the fourth control mode, the temperature of the exhaust gas is gradually increased by the heat generated by the glow plug 51. Accordingly, the temperatures of the compact oxidation catalyst 14 and the oxidation catalyst 13 are increased.

In the operation example shown in FIG. 4, when the temperature of the glow plug 51 becomes high, the fourth control mode ends. In this operation example, the glow plug 51 is heated for an electricity supply period set in advance. The ending time of the fourth control mode is not limited to this and may be set in another appropriate method. For example, the temperature of the exhaust gas is detected by a temperature sensor provided downstream of the glow plug 51, and the ending time of the electricity supply period may be set based on the defected temperature.

When the temperature of the glow plug 51 becomes high, the fuel is injected from the fuel supply valve 15. A flame is provided by injecting the fuel. That is, the exhaust gas control apparatus is shifted to the first control mode. In this operation example, the fuel is injected from the fuel supply valve 15 intermittently (in a pulsed manner). A predetermined amount of fuel is injected multiple times at regular intervals.

Figure 5:
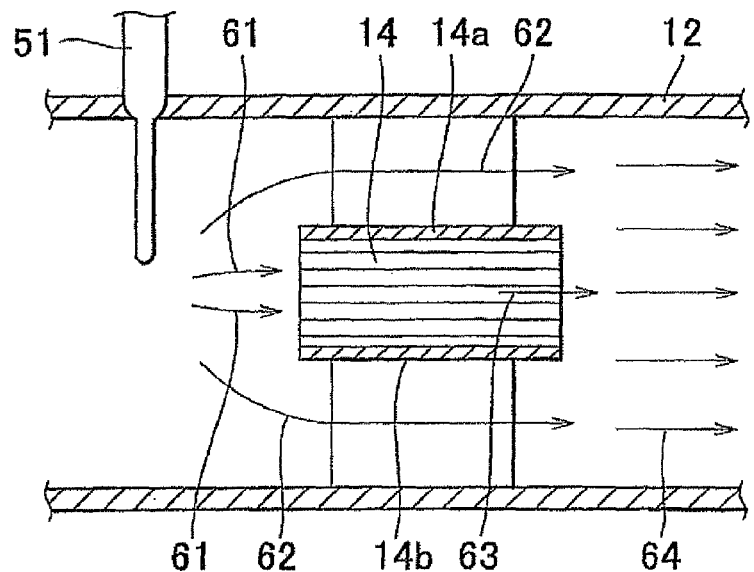
FIG. 5 is an enlarged cross-sectional view schematically showing a portion of an exhaust pipe, in which the compact oxidation catalyst is provided.

FIG. 5 is an enlarged cross-sectional view showing a portion of the exhaust pipe, in which the compact oxidation catalyst is provided, when the exhaust gas control apparatus is operated in the first control mode. When the fuel is heated by the glow plug 51 and ignited, a flame, is provided and the flame travels downstream along the exhaust gas flow. The flame increases the temperature of the exhaust gas.

In the first embodiment, the glow plug 51 is provided at a position that is upstream of the compact oxidation catalyst 14 and that is apart from the compact oxidation catalyst 14. An exhaust gas flow passage is formed on the outer side of the compact oxidation catalyst 14. Therefore, part of the flame travels through the passage formed between a side face 14b of the compact oxidation catalyst 14 and the exhaust pipe 12, as indicated by arrows 62. That is, part of the flame travels through a space between the compact oxidation catalyst 14 and the wall face of the engine exhaust passage. As described above, in this operation example, the provided flame surrounds the compact oxidation catalyst 14. The flame that travels through the passage formed on the outer side of the compact oxidation catalyst 14 contacts the side face 14b. Also, part of the flame reaches the upstream-side end face of the compact oxidation catalyst 14 as indicated by arrows 61, and enters the compact oxidation catalyst 14.

As shown in FIGS. 1, 4, and 5, if the exhaust gas control apparatus is operated in the first control mode where a flame is provided, the temperature of the exhaust gas is increased, and the high-temperature exhaust gas is sent downstream, as indicated by arrows 64. Therefore, components that are provided downstream of the compact oxidation catalyst 14, the oxidation catalyst 13, the particulate filter 16, the NOx storage catalyst 17, etc. are heated in a short time. Therefore, if the temperature of the oxidation catalyst 13 or the compact oxidation catalyst 14 is lower than the activation temperature, it is possible to increase the temperature of the catalyst to a temperature equal to or higher than the activation temperature in a short time. If the temperature of the oxidation catalyst 13 or the compact oxidation catalyst 14 is equal to or higher than the activation temperature, it is possible to increase the oxidation capacity of the catalyst by increasing the temperature of the catalyst in a short time.

Further, the fuel is reformed by providing a flame. For example, reductants such as HC and CO are formed. These reductants are sent to the oxidation catalyst 13 provided downstream of the position where the flame is provided. When the temperature of the oxidation catalyst 13 is equal to or higher than the activation temperature, the temperature of the oxidation catalyst 13 is increased quickly by the oxidation reaction heat of the reductants.

In the operation example shown in FIG. 4, the exhaust gas control apparatus is operated continuously in the first control mode even after the temperature of the compact oxidation catalyst 14 reaches the activation temperature Tx. After the temperature of the compact oxidation catalyst 14 reaches the activation temperature Tx, the injected unburned fuel is reformed and the reductants such as HC are formed in the compact oxidation catalyst 14. Also, HC, etc. are burned and lighter reductants are formed. Therefore, it is possible to supply the oxidation catalyst 13, provided downstream of the position where the flame is provided, with a large amount of reductants together with the reductants formed by a flame. The compact oxidation catalyst 14 is heated by the oxidation reaction caused in the compact oxidation catalyst 14, and the temperature of the exhaust gas is further increased. Therefore, it is possible to increase the temperatures of the exhaust gas processing devices that are provided downstream of the oxidation catalyst 13 in a short time.

As shown in FIG. 5, the reductants are discharged from the compact oxidation catalyst 14 as indicated by an arrow 63. In this case, the atomized or microparticulated reductants are discharged from the compact oxidation catalyst 14. The reductants discharged from the compact oxidation catalyst 14 may be ignited by the exhaust gas that flows through the passage formed on the outer side of the compact oxidation catalyst 14 as indicated by the arrows 62. That is, it is possible to provide a flame at the outlet of the compact oxidation catalyst 14. If a flame is provided at the outlet of the compact oxidation catalyst 14, the flame expands within the entirety of the exhaust pipe 12. As a result, it is possible to increase the combustion efficiency at a position downstream of the compact oxidation catalyst 14. Therefore, it is possible to further increase the temperature of the exhaust gas. Alternatively, it is possible to form lighter reductants. As a result, it is possible to increase the temperatures of the exhaust gas processing devices that are provided downstream of the oxidation catalyst 13 in a shorter time.

Figure 6:
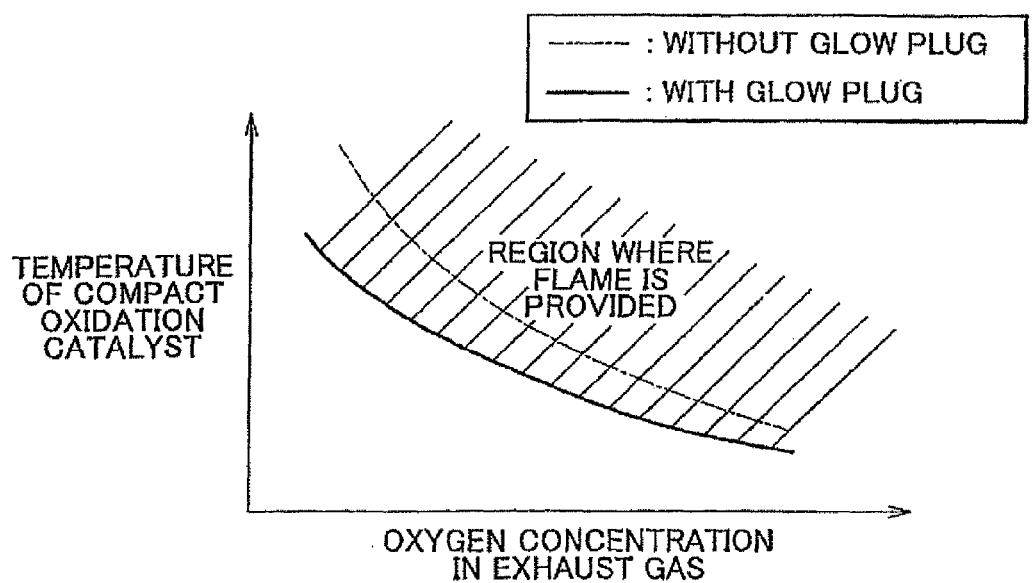
FIG. 6 is a graph showing a region where it is possible to provide a flame at the outlet of the compact oxidation catalyst.

FIG. 6 is a graph showing the region where it is possible to provide a flame at the outlet of the compact oxidation catalyst. FIG. 6 shows the case where the glow plug is provided to provide a flame, and the case where a flame is provided without the glow plug. Whether a flame is provided at the outlet of the compact oxidation catalyst 14 depends on the oxygen concentration in the exhaust gas and the temperature of the compact oxidation catalyst 14 (temperature of the gas at the outlet of the compact oxidation catalyst 14). At the outlet of the compact oxidation catalyst, a flame is provided more easily as the oxygen concentration in the exhaust gas increases. Also, a flame is provided more easily as the temperature of the compact oxidation catalyst increases. Even if the glow plug is not provided, it is possible to provide a flame under a predetermined condition. FIG. 6 shows the comparison between the case where the glow plug is provided and the case where the glow plug is not provided. If the glow plug is provided, a flame is provided at the outlet of the compact oxidation catalyst 14 within a broader temperature range.

Figure 7:
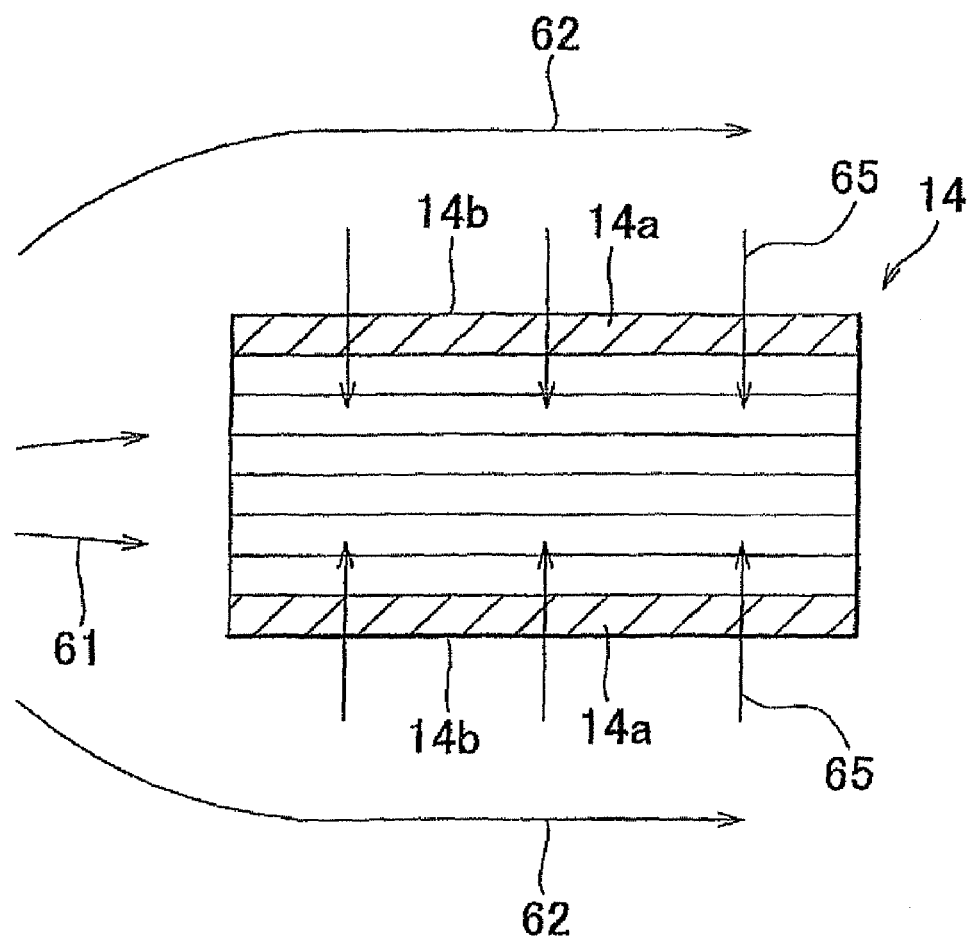
FIG. 7 is an enlarged cross-sectional view that schematically shows the compact oxidation catalyst, and that illustrates the manner in which heat is transferred in the compact oxidation catalyst.

FIG. 7 is an enlarged cross-sectional view schematically showing the compact oxidation catalyst when the exhaust gas control apparatus is operated in the first control mode. When, for example, the unburned fuel supplied into the compact oxidation catalyst 14 is oxidized, the temperature of the compact oxidation catalyst 14 is increased. In this case, the temperature of the inner-side portion of the compact oxidation catalyst 14 is increased first, and the outer-side portion of the compact oxidation catalyst 14 is then increased. Therefore, a temperature gradient occurs in the base material of the compact oxidation catalyst 14.

In this operation example, as indicated by the arrows 62, a flame travels through the space on the outer side of the compact oxidation catalyst 14. That is, the flame travels through the space between the compact oxidation catalyst 14 and the wall face of the engine exhaust passage. Therefore, as indicated by arrows 65, the heat of the flame is transferred from the outer-side portion of toward the inner-side portion of the compact oxidation catalyst 14, and the temperature gradient that occurs in the base material is decreased. The thermal stress that is generated inside the base material is decreased. As a result, it is possible to increase the heat resistance of the compact oxidation catalyst 14.

According to the first embodiment, part of the flame provided by the glow plug 51 travels through the space on the outer side of the compact oxidation catalyst 14. Alternatively, the entirety of the flame provided by the glow plug 51 may be directed to the end face of the compact oxidation catalyst 14. With this configuration, it is possible to increase the temperature of the compact oxidation catalyst 14 in a short time.

In the operation example shown in FIG. 4, the exhaust gas control apparatus is continuously operated in the first control mode where the glow plug is on even after the temperature of the compact oxidation catalyst 14 reaches the activation temperature. Alternatively, for example, supply of electricity to the glow plug 51 may be stopped after it is determined based on the temperature detected by the temperature sensor 25 that the temperature of the compact oxidation catalyst 14 has reached the activation temperature. That is, the control mode may be switched to the third control mode when the temperature of the compact oxidation catalyst reaches the activation temperature. If the glow plug is not provided, it is necessary to wait until the temperature of the compact oxidation catalyst is increased to the activation temperature by the exhaust gas discharged from the engine body 1. However, if the glow plug is provided and the exhaust gas control apparatus is operated in the first control mode, it is possible to increase the temperature of the compact oxidation catalyst to the activation temperature in a short time. As a result, it is possible to increase the temperatures of the exhaust gas processing devices such as the oxidation catalyst provided downstream of the compact oxidation catalyst in a short time.

Figure 8:
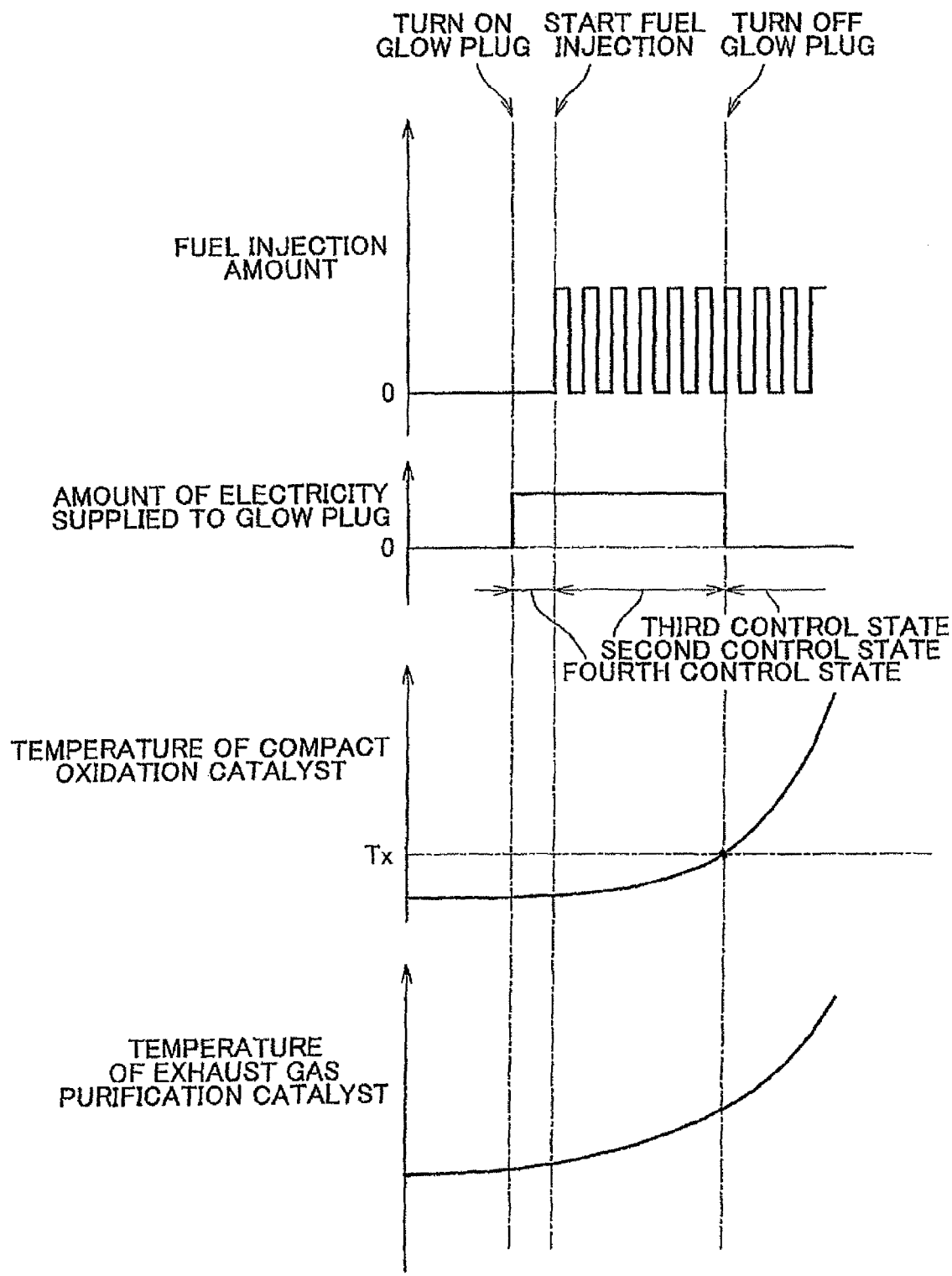
FIG. 8 is a time chart illustrating a second control mode and a third control mode in the first embodiment of the invention.
Figure 9:
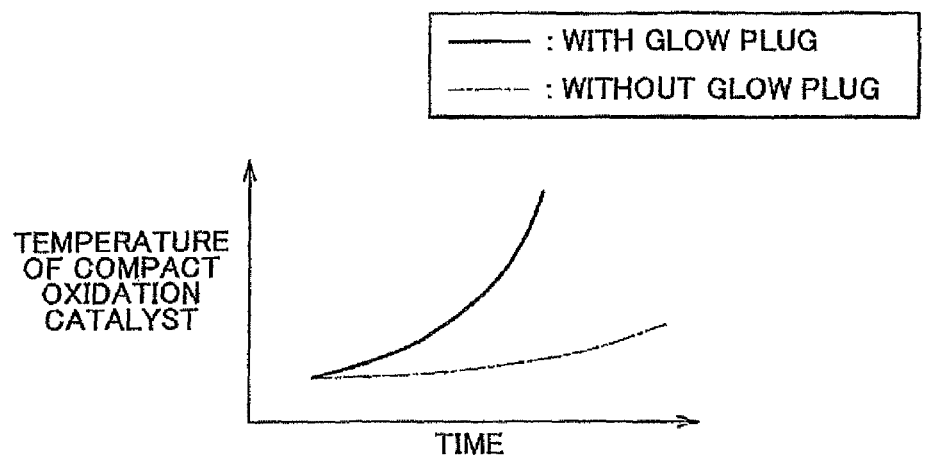
FIG. 9 is a graph illustrating the manner in which the temperature of the compact oxidation catalyst is increased in the second control mode.

Next, the second control mode and the third control mode according to the first embodiment will be de scribed with reference to FIGS. 8 and 9.

FIG. 8 is a time chart that shows an operation example in which the exhaust gas control apparatus is operated in the second control mode and then operated in the third control mode. The exhaust gas control apparatus is operated in the second control mode when the exhaust gas state is in the operation region where it is not possible to ignite the fuel even if the fuel is heated by the glow plug. First, the exhaust gas control apparatus is operated in the fourth control mode Where electricity is supplied to the glow plug 51 with supply of fuel from the fuel supply valve 15 stopped. At this time, the temperature of the compact oxidation catalyst 14 is lower than the activation temperature Tx. When the temperature of the glow plug 51 reaches a high temperature, the fuel is injected from the fuel supply valve 15 with electricity supplied to the glow plug 51. In this case, because it is not possible to ignite the fuel, a flame is not provided and the fuel is supplied to the compact oxidation catalyst 14 in the form of liquid.

FIG. 9 shows the manners in which the temperature of the compact oxidation catalyst is increased in the case where the glow plug is provided and in the case where the glow plug is not provided. The abscissa axis represents time, and the ordinate axis represents the temperature of the compact oxidation catalyst. When the temperature of the compact oxidation catalyst 14 is lower than the activation temperature and the glow plug is not provided, the compact oxidation catalyst 14 has not been activated. In this case, the temperature of the compact oxidation catalyst 14 increases more moderately than the temperature of the exhaust gas. In contrast, when the glow plug is provided upstream of the compact oxidation catalyst 14 and the fuel is supplied to the compact oxidation catalyst 14 with electricity supplied to the glow plug 51, the temperature of the compact oxidation catalyst 14 is increased quickly. That is, if the glow plug 51 is provided and the fuel is injected, it is possible to activate the compact oxidation catalyst 14 even in the atmosphere in which the compact oxidation catalyst 14 is not activated if the glow plug 51 is not provided. Therefore, it is possible to increase the temperature of the compact oxidation catalyst 14 in a short time.

If the exhaust gas control apparatus is operated in the second control mode as shown in FIG. 8, it is possible to increase the temperature of the compact oxidation catalyst 14 to the activation temperature in a short time. When the temperature of the compact oxidation catalyst 14 reaches the activation temperature, supply of electricity to the glow plug 51 is stopped. That is, the exhaust gas control apparatus is shifted to the third control mode where the fuel is injected, after supply of electricity to the glow plug 51 is stopped. Because the temperature of the compact oxidation catalyst 14 has reached the activation temperature, the fuel injected into the compact oxidation catalyst 14 is oxidized. The temperature of the compact oxidation catalyst 14 is increased quickly by the oxidation reaction heat that is generated when the fuel is oxidized. Because the temperature of the compact oxidation catalyst 14 is increased, the temperature of the exhaust gas is increased and the exhaust gas processing devices such as the oxidation catalyst 13 are heated.

Because the flow resistance in the compact oxidation catalyst 14 is high, the amount of exhaust gas that flows in the compact oxidation catalyst 14 is small. In addition, because the gas expands in the compact oxidation catalyst 14 if oxidation reaction occurs in the compact oxidation catalyst 14, the amount of exhaust gas that flows in the compact oxidation catalyst 14 is further decreased. Also, because the viscosity of the gas is increased if the temperature of the gas is increased due to the oxidation reaction, the amount of exhaust gas that flows in the compact oxidation catalyst 14 is further decreased. Accordingly, the flow velocity of the exhaust gas in the compact oxidation catalyst 14 is considerably lower than the flow velocity of the exhaust gas that flows through the exhaust pipe 12.

Because the flow velocity o the exhaust gas in the compact oxidation catalyst 14 is low, the oxidation reaction in the compact oxidation catalyst 14 is active. Also, because the volume of the compact oxidation catalyst 14 is small, the temperature of the compact oxidation catalyst 14 is rapidly increased to a considerably high temperature.

Also, if the temperature of the compact oxidation catalyst 14 becomes high, the hydrocarbon in the fuel, which has a large carbon number, is decomposed to form hydrocarbon that has a small carbon number and that has high reactivity. That is, the fuel is reformed into lighter fuel that has higher reactivity. When the temperature of the oxidation catalyst 13 is equal to or higher than the activation temperature, the temperature is increased quickly due to the oxidation reaction that is caused in the oxidation catalyst 13 by the reductants discharged from the compact oxidation catalyst 14. Thus, if the fuel is supplied to the compact oxidation catalyst 14, the compact oxidation catalyst 14 forms both a quick heater that quickly generates heat and a reformed fuel discharger that discharges the reformed fuel.

In the operation example shown in FIG. 8, the exhaust gas control apparatus is shifted from the second control mode to the third control mode when the temperature of the compact oxidation catalyst reaches the activation temperature. Alternatively, the exhaust gas control apparatus may be continuously operated in the second control mode even after the temperature of the compact oxidation catalyst reaches the activation temperature.

Figure 10:
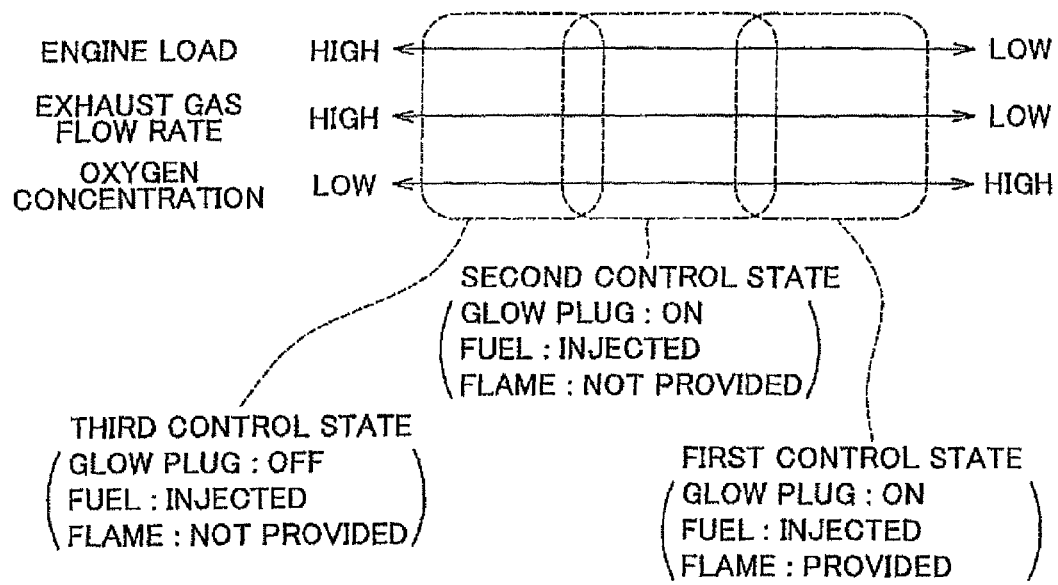
FIG. 10 is a view illustrating examples of a region where the exhaust gas control apparatus is operated in the first control mode, a region where the exhaust gas control apparatus is operated in the second control mode, and a region where the exhaust gas control apparatus is operated in the third control mode.

FIG. 10 is a view schematically showing the relationship between the control modes in the first embodiment, and the engine load, the exhaust gas flow rate and the oxygen concentration in the exhaust gas. In this example, when the engine load is low, the exhaust gas flow rate is low, and the oxygen concentration is high, it is possible to ignite the fuel easily. Therefore, the exhaust gas control apparatus is operated in the first control mode. That is, it is possible to provide a flame to quickly increase the temperatures of the exhaust gas processing devices provided downstream of the compact oxidation catalyst 14. When the engine load is increased, the exhaust gas flow rate is increased and the oxygen concentration is decreased, it is difficult to ignite the fuel and the exhaust gas control apparatus is operated in the second control mode. When the engine load is further increased, the exhaust gas flow rate is further increased, and the oxygen concentration is further decreased, the exhaust gas control apparatus is operated in the third control mode.

The control mode may be appropriately selected from among the first control mode, the second control mode, and the third control mode based on, for example, the engine load, the exhaust gas flow rate, the oxygen concentration and the state of a battery. For example, in the region where it is possible to ignite the fuel, the exhaust gas control apparatus may be operated in the first control mode instead of being operated in the other control modes. Alternatively, the first control mode and the second control mode may be used in combination. The sequence of the control modes may be changed on an as-needed basis.

Each control mode may end when the temperature of the oxidation catalyst that is provided downstream of the compact oxidation catalyst reaches a required temperature. That is, when a requirement for the exhaust gas processing device is satisfied, the control mode may end. Alternatively, when the temperature of the compact oxidation catalyst reaches the upper limit temperature at which the compact oxidation catalyst may break, the control mode may end. As described above, the condition for ending the control mode may be set on an as-required basis.

Next, the case where the exhaust gas processing device provided downstream of the compact oxidation catalyst is the NOx storage catalyst will be described.

Figure 11:
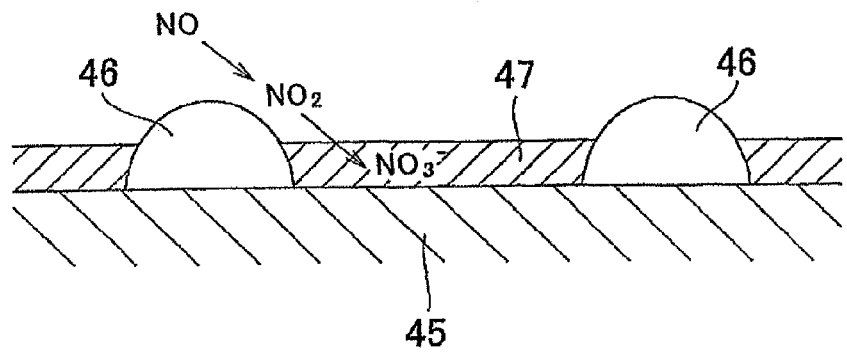
FIG. 11 is an enlarged cross-sectional view schematically showing a NOx storage catalyst.

FIG. 11 is a cross-sectional view schematically showing the NOx storage catalyst. In the NOx storage catalyst 17, a catalyst carrier 45 made of, for example, alumina is carried on a base body. Noble metal catalysts 46 are carried on the surface of the catalyst carrier 45 in dispersed locations. A layer of NOx absorbent 47 is formed on the surface of the catalyst carrier 45. As the noble metal catalysts 46, for example, platinum Pt is used. As the component that forms the NOx absorbent 47, at least one of selected from alkali metals such as K, sodium Na and cesium Cs, alkali earths such as barium Ba and calcium Ca, and rare earths such as lanthanum La and yttrium Y is used.

The ratio between air and fuel (hydrocarbon) in the engine intake passage, the combustion chambers or the exhaust passage is referred to as the air-fuel ratio. When the air-fuel ratio of the exhaust gas is lean (when the oxygen concentration in the exhaust gas is high), NO contained in the exhaust gas is oxidized on the noble metal catalysts 46 into $NO_2$. Then, the $NO_2$ is absorbed into the NOx absorbent 47 in the form of nitrate ion $NO_3^-$.

On the other hand, when the air-fuel ratio of the exhaust gas is rich (when the fuel concentration in the exhaust gas is high) or equal to the stoichiometric air-fuel ratio, the reaction proceeds in the reverse direction ($NO_3^- \rightarrow NO_2$) because the oxygen concentration in the exhaust gas is decreased. The nitrate ion $NO_3^-$ in the NOx absorbent 47 is released from the NOx absorbent 47 in the form of $NO_2$. Next, the released NOx is reduced by the unburned HC and CO contained in the exhaust gas.

In the operation example according to the first embodiment, before the absorbing capacity of the NOx absorbent 47 is saturated, the fuel is supplied from the fuel supply valve 15 to make the air-fuel ratio of the exhaust gas temporarily rich. Thus, the NOx is released from the NOx absorbent 47.

When the oxidation catalyst 13 is provided between the compact oxidation catalyst 14 and the NOx storage catalyst 17 as in the embodiment shown in FIG. 1, if the exhaust gas control apparatus is operated in the first control mode, the second control mode or the third control mode, the temperature of the oxidation catalyst 13 is increased to the activation temperature in a short time. As a result, it is possible to supply the reductants formed in the oxidation catalyst 13 to the NOx storage catalyst.

Even if the oxidation catalyst is not provided between the compact oxidation catalyst and the NOx storage catalyst, if the exhaust gas control apparatus is operated in the first control mode or the second control mode as described above, the temperature of the compact oxidation catalyst is increased in a short time. As a result, it is possible to supply the reductants formed in the compact oxidation catalyst to the NOx storage catalyst. When the temperature of the compact oxidation catalyst is equal to or higher than the activation temperature, if the exhaust gas control apparatus is operated in the third control mode, it is possible to supply the reductants formed in the compact oxidation catalyst to the NOx storage catalyst.

When the exhaust gas control apparatus is operated in the first control mode, the fuel is reformed by a provided flame in addition to by the compact oxidation catalyst 14. Therefore, it is possible to supply good reductants, for example, light HC to the NOx storage catalyst. In addition, it is possible to supply a large amount of reductants to the NOx storage catalyst.

The exhaust gas contains SOx, that is, $SO_2$. If the $SO_2$ flows into the NOx storage catalyst 17, the $SO_2$ is oxidized in the noble metal catalyst 46 into $SO_3$. Next, the $SO_3$ is absorbed into the NOx absorbent 47, and is dispersed within the NOx absorbent 47 in the form of sulfate ion $SO_4^{2-}$ while being combined with, for example, barium carbonate BaCO to form stable hydrosulfate $BaSO_4$. However, because the NOx absorbent 47 has strong basicity, the hydrosulfate $BaSO_4$ is stable and is not decomposed easily. Therefore, if the air-fuel ratio of the exhaust gas is just made rich, the hydrosulfate $BaSO_4$ remains without being decomposed. Therefore, the amount of hydrosulfate $BaSO_4$ in the NOx absorbent 47 increases with time. Therefore, the amount of NOx that can be absorbed in the NOx absorbent 47 decreases with time. That is, sulfur poisoning occurs in the NOx storage catalyst 17.

In this case, the air-fuel ratio of the exhaust gas that flows into the NOx storage catalyst 17 is made rich with the temperature of the NOx storage catalyst 17 increased to the SOx release temperature, that is, a temperature equal to or higher than 600° C. In this way, SOx is released from the NOx absorbent 47.

When the oxidation catalyst 13 is provided between the compact oxidation catalyst 14 and the NOx storage catalyst 17 as in the apparatus in FIG. 1, if the exhaust gas control apparatus is operated in the first control mode, the second control mode or the third control mode, it is possible to increase the temperature of the oxidation catalyst 13 as described above to increase the temperature of the exhaust gas. As a result, it is possible to increase the temperature of the NOx storage catalyst 17 in a short time. Especially, in the first control mode, the temperature of the exhaust gas is increased by a flame. Also, a large amount of reformed fuel is formed by the compact oxidation catalyst 14 and the flame, and the reformed fuel is oxidized in the oxidation catalyst 13. Therefore, it is possible to increase the temperature of the NOx storage catalyst to the SOx release temperature in a short time.

When the oxidation catalyst is not provided between the NOx storage catalyst and the compact oxidation catalyst, if the exhaust gas control apparatus is operated in the first control mode, the temperature of the exhaust gas is increased by the flame and the heat generated by oxidation reaction caused in the compact oxidation catalyst. Accordingly, it is possible to increase the temperature of the NOx storage catalyst to the SOx release temperature in a short time. Alternatively, if the exhaust gas control apparatus is operated in at least one of the second control mode and the third control mode, it is possible to increase the temperature of the compact oxidation catalyst in a short time to make the temperature of the exhaust gas high. As a result, it is possible to increase the temperature of the NOx storage catalyst in a short time.

Next, recovery of the particulate filter that is provided downstream of the compact oxidation catalyst will be described.

The particulate filter removes particulate matter, for example, carbon particulate and ion particulate, for example, sulfate contained in the exhaust gas. The particulate filter has, for example, the honeycomb structure, and has multiple passages that extend in the direction of gas flow. The multiple passages include passages of which the downstream-side ends are closed and passages of which the upstream-side ends are closed. The passages of which the downstream-side ends are closed and the passages of which the upstream-side ends are closed are alternately arranged. The partitions of the passages are formed of porous material, for example, cordierite. When the exhaust gas flows through the partitions, the particulate matter is trapped.

In the apparatus shown in FIG. 1, the particulate matter is trapped on the particulate filter 16 and oxidized. However, if the amount of particulate matter that is trapped on the particulate filter 16 is larger than the amount of particulate matter that is oxidized, the particulate matter is gradually accumulated on the particulate filter 16. If the amount of particulate matter that is accumulated on the particulate filter 16 increases, the engine output may decrease. In this case, a filter recovery process is executed. In the filter recovery process, the temperature of the particulate filter 16 is increased to, for example, approximately 600° C. in the atmosphere in which the amount of oxygen is excessive to oxidize and remove the particulate matter accumulated on the particulate filter 16.

In the apparatus shown in FIG. 1, when the amount of particulate matter accumulated on the particulate filter 16 exceeds the allowable amount, the temperature of the particulate filter 16 is increased in the state where the air-fuel ratio of the exhaust gas is lean to oxidize and remove the particulate matter accumulated on the particulate filter 16. If the pressure difference ΔP between the upstream side and the downstream side of the particulate filter 16, which is detected by the pressure difference sensor 28, exceeds the allowable value Px, it is determined that the amount of accumulated particulate matter exceeds the allowable amount.

In the recovery of the particulate filter 16, if the exhaust gas control apparatus is operated in the first control mode, the second control mode or the third control mode as in the process of increasing the temperature of the NOx storage catalyst, it is possible to increase the temperature of the oxidation catalyst 13 in a short time. As a result, it is possible to increase the temperature of the particulate filter 16 in a short time. Even if the oxidation catalyst is not provided between the particulate filter and the compact oxidation catalyst, it is possible to increase the temperature of the particulate filter in a short time, as in the process of increasing the temperature of the NOx storage catalyst.

In the apparatus shown in FIG. 1, a noble metal catalyst is not carried on the particulate filter 16. However, a noble metal catalyst, for example, platinum Pt may be carried on the particulate filter 16. In this case, the particulate filter 16 may be used as an oxidation catalyst.

Figure 12:
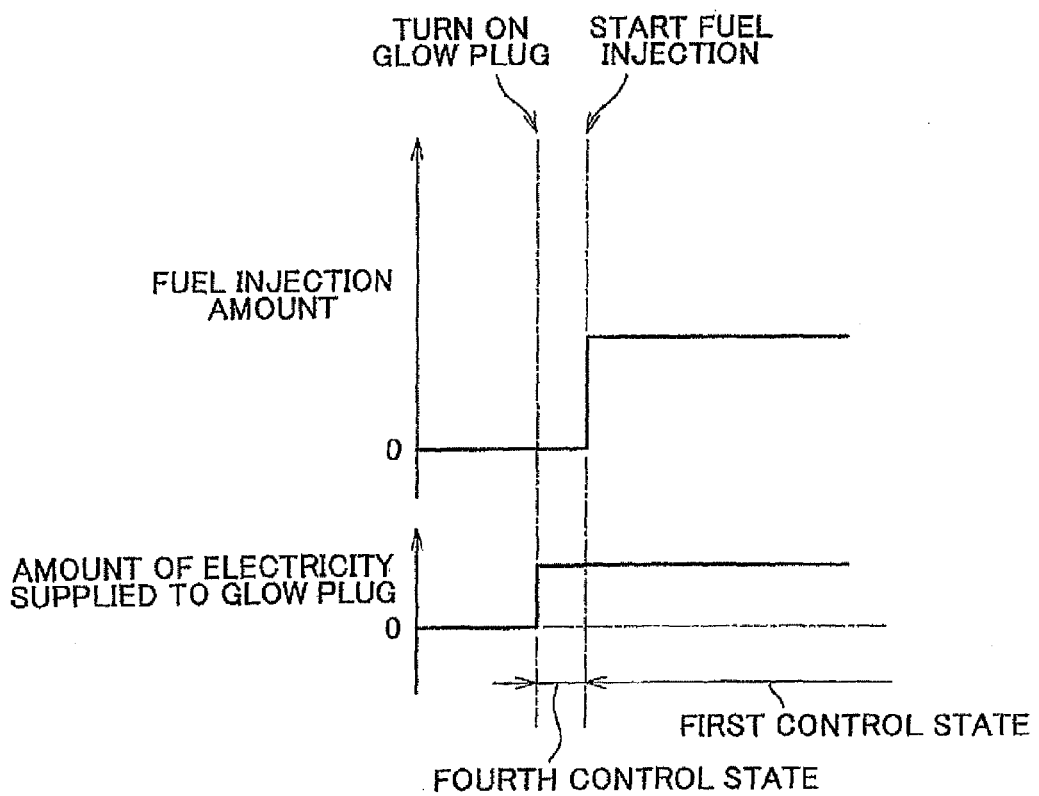
FIG. 12 is a time chart illustrating an example of a manner in which the fuel is supplied from a fuel supply valve.

FIG. 12 is a time chart illustrating another manner in which the fuel is supplied from the fuel supply valve. As shown in FIG. 12, the fuel may be continuously supplied from the fuel supply valve. A constant amount of fuel may be continuously injected, or the fuel supply amount may be changed during operation.

In the operation examples shown in FIG. 4 and FIG. 8, the fuel is intermittently supplied from the fuel supply valve. Because the fuel is intermittently supplied, air is present between the fuel supplied in one injection and the fuel supplied in the subsequent injection. That is, the fuel that is intermittently supplied contacts a large amount of fuel and is burned. As a result, it is possible to improve the combustion characteristic to increase the temperature of a flame. Alternatively, it is possible to burn the unburned fuel.

If the fuel having a rich air-fuel ratio (low air-fuel ratio A/F) is continuously supplied from the fuel supply valve, the ratio of the amount of air to the amount of fuel is small is decreased. Therefore, the amount of fuel that is not burned increases. However, if the fuel is intermittently supplied, it is possible to improve the combustion characteristic to decrease the amount of fuel that is not burned. Alternatively, it is possible to decrease the air-fuel ratio of the fuel. When the exhaust gas processing device that is provided downstream of the compact oxidation catalyst is the NOx storage catalyst, it is possible to decrease the air-fuel ratio of the fuel that is intermittently supplied. Therefore, it is possible to supply appropriate reductants to the NOx storage catalyst.

The exhaust gas control apparatus may includes a determination unit that determines whether it is possible to ignite the fuel with the use of the glow plug. The control unit of the exhaust gas control apparatus selects the control mode based on the result of determination made by the determination unit. The determination unit includes, for example, a flow rate sensor that detects the flow rate of the exhaust gas and an oxygen sensor that detects the oxygen concentration. To detect the oxygen concentration, the oxygen concentration in the exhaust pipe may be estimated with the use of the air-fuel ratio sensor. Alternatively, the oxygen concentration in the exhaust pipe may be estimated according to a map of the oxygen concentration that depends on the engine speed and the drive power. As described above, the determination unit determines whether it is possible to provide a flame based on signals from a flow rate detection unit and an oxygen concentration detection unit. The determination unit may further include an exhaust gas temperature detection unit that detects the temperature of the exhaust gas.

In the first embodiment, the fuel supply valve is used as the fuel supply device. However, any device that is able to supply the fuel toward the compact oxidation catalyst may be used as the fuel supply device.

In the first embodiment, the glow plug is used as the heating device. However, any device that is able to ignite the supplied fuel may be used as the heating device. For example, a spark plug or a ceramic heater may be used as the heading device.

In the first embodiment, the electronic control unit that controls the engine body is used as the control unit. However, any control unit that is able to operate the exhaust gas control apparatus in each control mode may be used as the control unit. For example, an independent control unit for the exhaust gas control apparatus, which is separate from the electronic control unit that controls the engine body, may be used.

In the first embodiment, the oxidation catalyst, the NOx storage catalyst and the particulate filter are used as the exhaust gas processing devices. However, the invention may be applied to any device that purifies the exhaust gas. In addition, one of the exhaust gas processing devices may be used, or some of the exhaust gas processing devices may be used in combination.

The first embodiment has been described on the assumption that the diesel engine is used as the internal combustion engine. However, the invention may be applied to an exhaust gas control apparatuses for any types of internal combustion engines.

Next, the exhaust gas control apparatus for an internal combustion engine according to a second embodiment of the invention will be described with reference to FIG. 13 to FIG. 17. In the second embodiment of the invention, operation examples of the exhaust gas control apparatus according to the first embodiment will be described.

Figure 13:
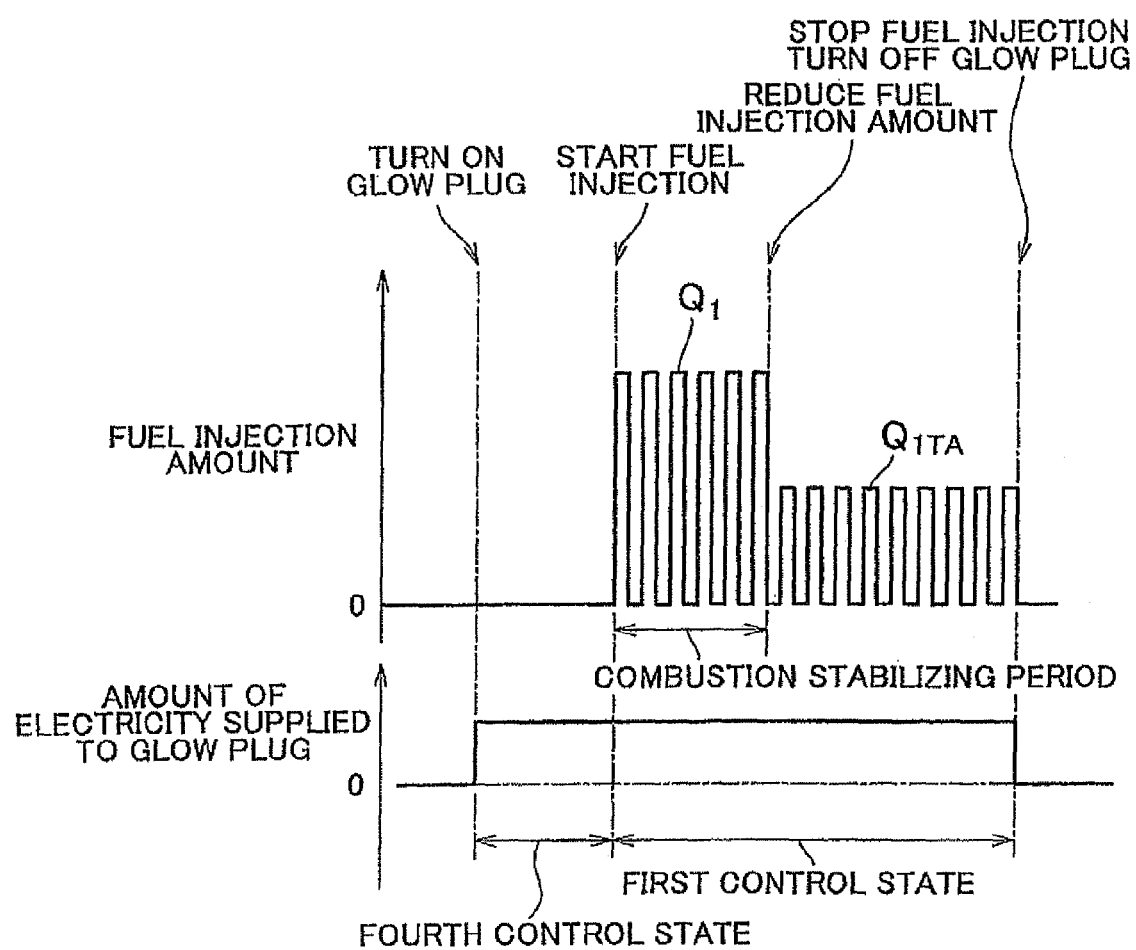
FIG. 13 is a time chart illustrating a first operation example in a second embodiment of the invention.

FIG. 13 is a time chart when the first control mode is started. In the operation, example shown in FIG. 13, the first fuel supply amount $Q_1$ that is used when the operation is started in the first control mode is set in advance. The second fuel supply amount $Q_{1T4}$ that is used when the exhaust gas control apparatus is constantly operated in the first control mode is set in advance. The first fuel supply amount $Q_1$ is set to a value that is larger than the second fuel supply amount $Q_{1T4}$. When the operation in the first control mode is started, the fuel is ignited while the fuel is supplied in the first fuel supply amount $Q_1$, and the fuel supply amount is decreased to the second fuel supply amount $Q_{1T4}$ after a predetermined time has elapsed. In the second embodiment, the fuel supply amount is decreased after a combustion stabilizing period has elapsed.

The combustion stabilizing period is a period until the fuel combustion becomes stable. In the second embodiment, the combustion stabilizing period is set in advance. The ending time of the combustion stabilizing period may be set in any appropriate method. For example, the ending time of the combustion stabilizing period may be set to the time when the detected temperature at the outlet of the compact oxidation catalyst is increased to a predetermined temperature.

When the glow plug is used to ignite the fuel, the fuel is stably ignited by supplying a large amount of fuel. For example, if the ambient temperature is low when the fuel is ignited, fuel ignition may be unstable. In this case, if the fuel is supplied in the first fuel supply amount $Q_1$, that is, a large amount of fuel is supplied, it is possible to ignite the fuel more stably. If a flame is provided and the ambient temperature is increased, the combustion takes place stably. Even if the fuel supply amount is decreased after the ambient temperature is increased, the combustion takes place stably. Therefore, a control for decreasing the fuel supply amount of the second fuel supply amount $Q_{1TA}$ is executed. It is possible to prevent excess fuel consumption, excess release of HC, etc. by executing this control.

Figure 14:
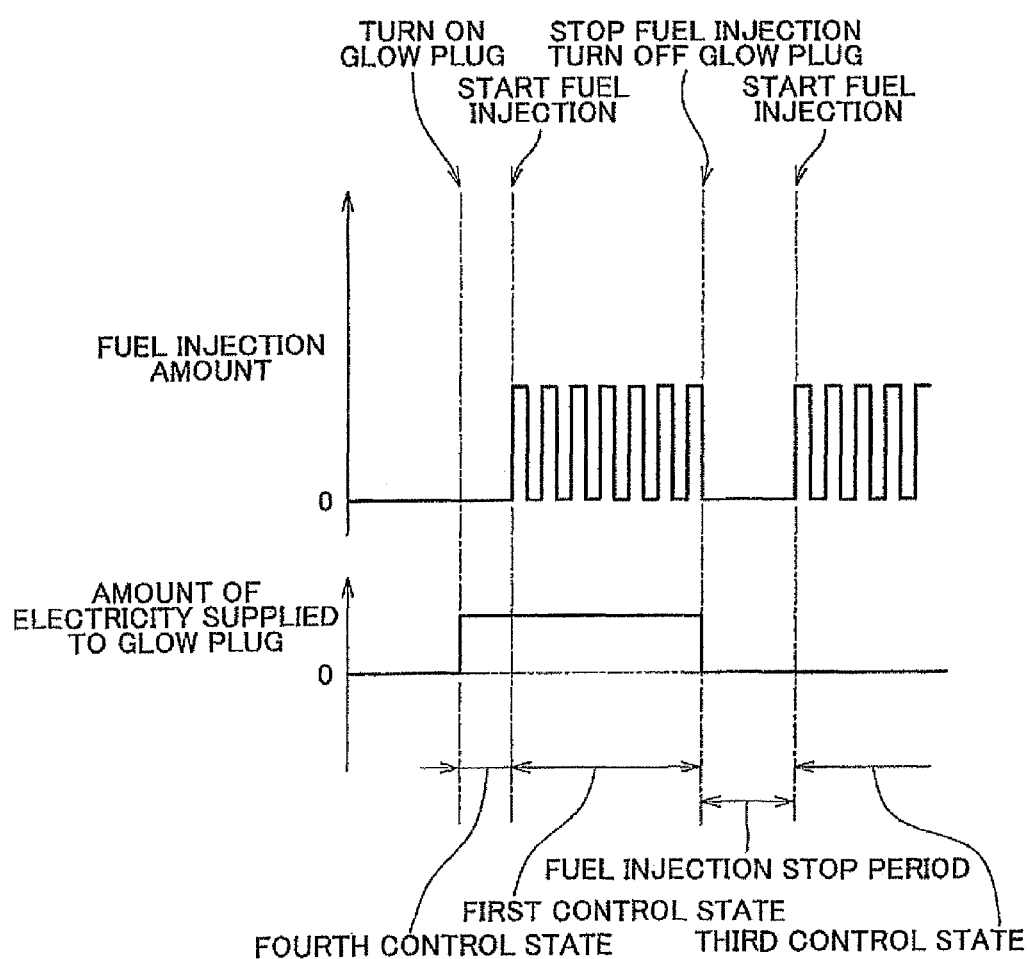
FIG. 14 is a time chart illustrating a second operation example in the second embodiment of the invention.

FIG. 14 is a time chart when the control mode is switched from the first control mode to the third control mode. In the operation example shown in FIG. 14, when the control mode is switched from the first control mode to the third control mode, heating of the exhaust gas with the use of the glow plug is stopped and the fuel injection stop period in which the fuel is not supplied from the fuel supply valve is set between the ending time of the first control mode and the starting time of the third control mode. That is, when the requirement for the first control mode is satisfied, fuel injection from the fuel supply valve is stopped and the electricity supplied to the glow plug is decreased to 0. After the fuel injection stop period has elapsed, fuel supply is started and the control mode is switched to the third control mode.

As shown in FIG. 14, the exhaust gas control apparatus may be shifted to the third control mode after being operated in the first control mode. For example, the exhaust gas control apparatus may be operated in the first control mode to increase the temperature of the compact oxidation catalyst to the activation temperature, and the exhaust gas control apparatus may be shifted to the third control mode after the activation temperature is achieved. Because the exhaust gas control apparatus is operated in the first control mode, the flame contacts the end face of the compact oxidation catalyst and the temperature of the end face is increased. Alternatively, the flame contacts the side face of the compact oxidation catalyst and the temperature of the side face is increased. Especially, when a flame is provided, the temperature of the end face of the compact oxidation catalyst may be considerably high. In this state, if the exhaust gas control apparatus is shifted to the third control mode and the low-temperature liquid fuel is directly injected toward the compact oxidation catalyst, the base material is abruptly cooled and a crack may be caused in the base material.

However, if the period in which the fuel supply is stopped and electricity is not supplied to the glow plug is set between the ending time of the first control mode and the starting time of the third control mode, it is possible to decrease the temperature, of the compact oxidation catalyst and to prevent the compact oxidation catalyst from being cooled abruptly. In the second embodiment, the fuel injection stop period is set in advance. The ending time of the fuel injection stop period may be set in any appropriate method. For example, the ending time of the fuel injection stop period may be set to the time when the detected temperature at the outlet of the compact oxidation catalyst is decreased to the predetermined temperature.

Figure 15:
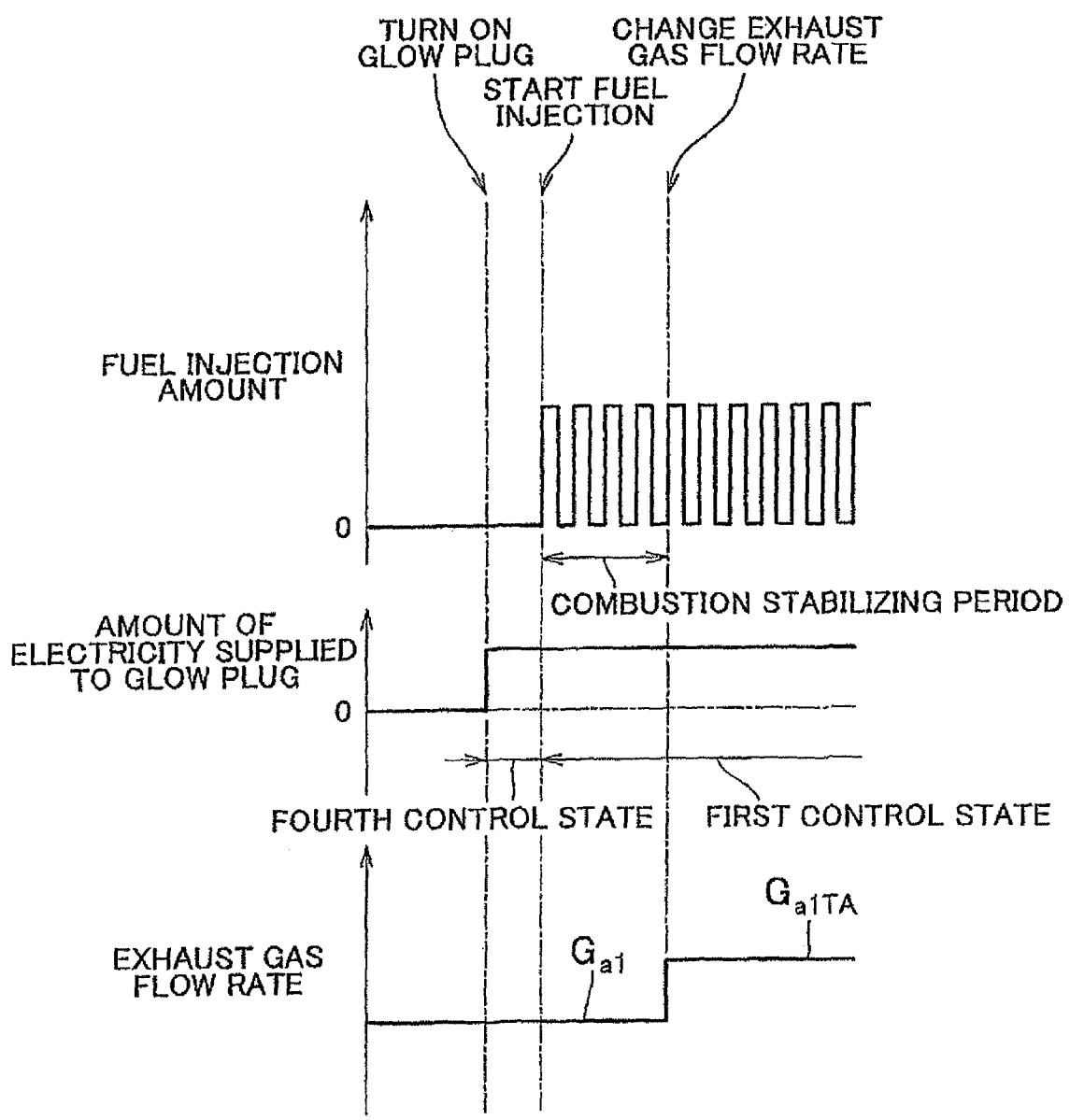
FIG. 15 is a time chart illustrating a third operation example in the second embodiment of the invention.

FIG. 15 is a time chart when the operation in the first control mode is started. In the operation example shown in FIG. 15, the flow rate of the exhaust gas flowing through the exhaust pipe is adjusted to ignite the fuel stably. When the operation in the first control mode is started, the fuel is ignited in the state where the exhaust gas is supplied at the first flow rate $Ga_1$ that is lower than the second flow rate $Ga_{1TA}$ of the exhaust gas in the first control mode. In the operation example in FIG. 15, the flow rate of the exhaust gas is decreased when the fuel is ignited, and is increased when a predetermined period has elapsed. In the second embodiment, a control for increasing the flow rate of the exhaust gas to the second flow rate $Ga_{1TA}$ is executed after the combustion stabilizing period has elapsed.

As shown in FIG. 1, the exhaust gas control apparatus for an internal combustion engine according to the second embodiment includes an exhaust gas flow rate adjustment device that adjusts the flow rate of the exhaust gas flowing through the engine exhaust passage. For example, it is possible to adjust the flow rate of the exhaust gas by controlling throttle valve 10 that supplies the fuel into the engine body 1. Alternatively, it is possible to adjust the flow rate of the exhaust gas flowing through the catalyst by controlling the EGR control valve 19 arranged in the recirculation passage for the engine body 1. For example, when the fuel is ignited, it is possible to decrease the flow rate of the exhaust gas flowing into the catalyst by temporarily increasing the amount of exhaust gas recirculated back to the engine body 1.

The exhaust gas flow rate adjustment device in the second embodiment is controlled by the electronic control unit 30. The exhaust gas flow rate adjustment device is not limited to the units described above. Any types of device that adjusts the flow rate of the exhaust gas flowing into the exhaust gas control apparatus may be used as the exhaust gas flow rate adjustment device.

If the flow rate of the exhaust gas is high, the ignition of the fuel may be unstable. If the flow rate of the exhaust gas is decreased when the fuel is ignited, the fuel is ignited stably. After the combustion stabilizing period has elapsed, it is possible to increase the flow rate of the exhaust gas because the combustion takes place stably. If the flow rate of the exhaust gas is increased, formation of turbulent flows of the exhaust gas is promoted, and the combustion efficiency and diffuseness of a flame are improved. Especially, in the apparatus shown in FIG. 1, a large amount of exhaust gas hits the compact oxidation catalyst 14, whereby formation of turbulent flows of the exhaust gas at a position downstream of the compact oxidation catalyst 14 is promoted.

Because formation of turbulent flows of the exhaust gas is promoted, the liquid fuel that adheres to the compact oxidation catalyst 14 is blown away and burned near the compact oxidation catalyst 14. As a result, it is possible to make it easier to ignite the reductants emitted from the compact oxidation catalyst 14.

Figure 16:
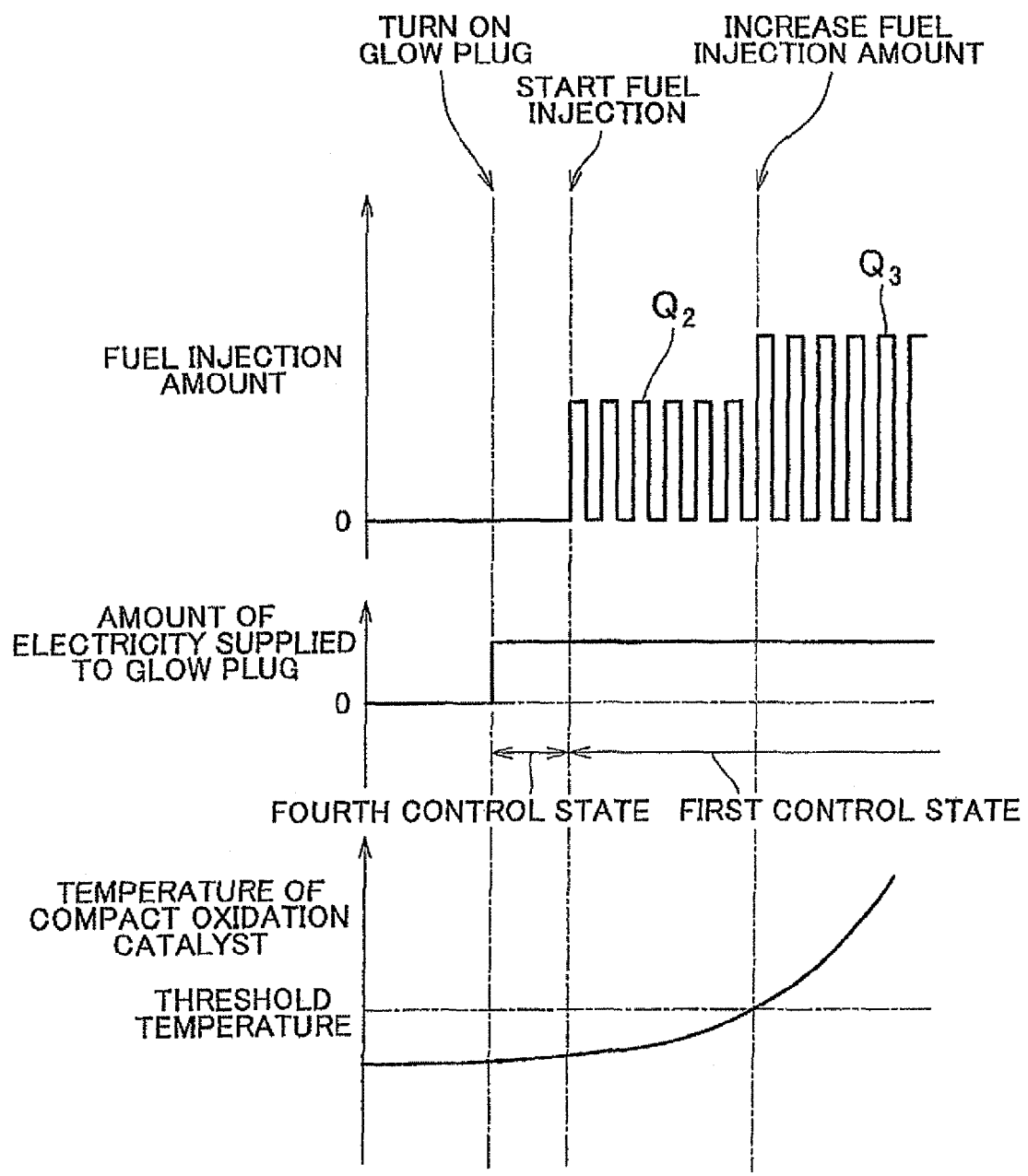
FIG. 16 is a time chart illustrating a fourth operation example in the second embodiment of the invention.
Figure 17:
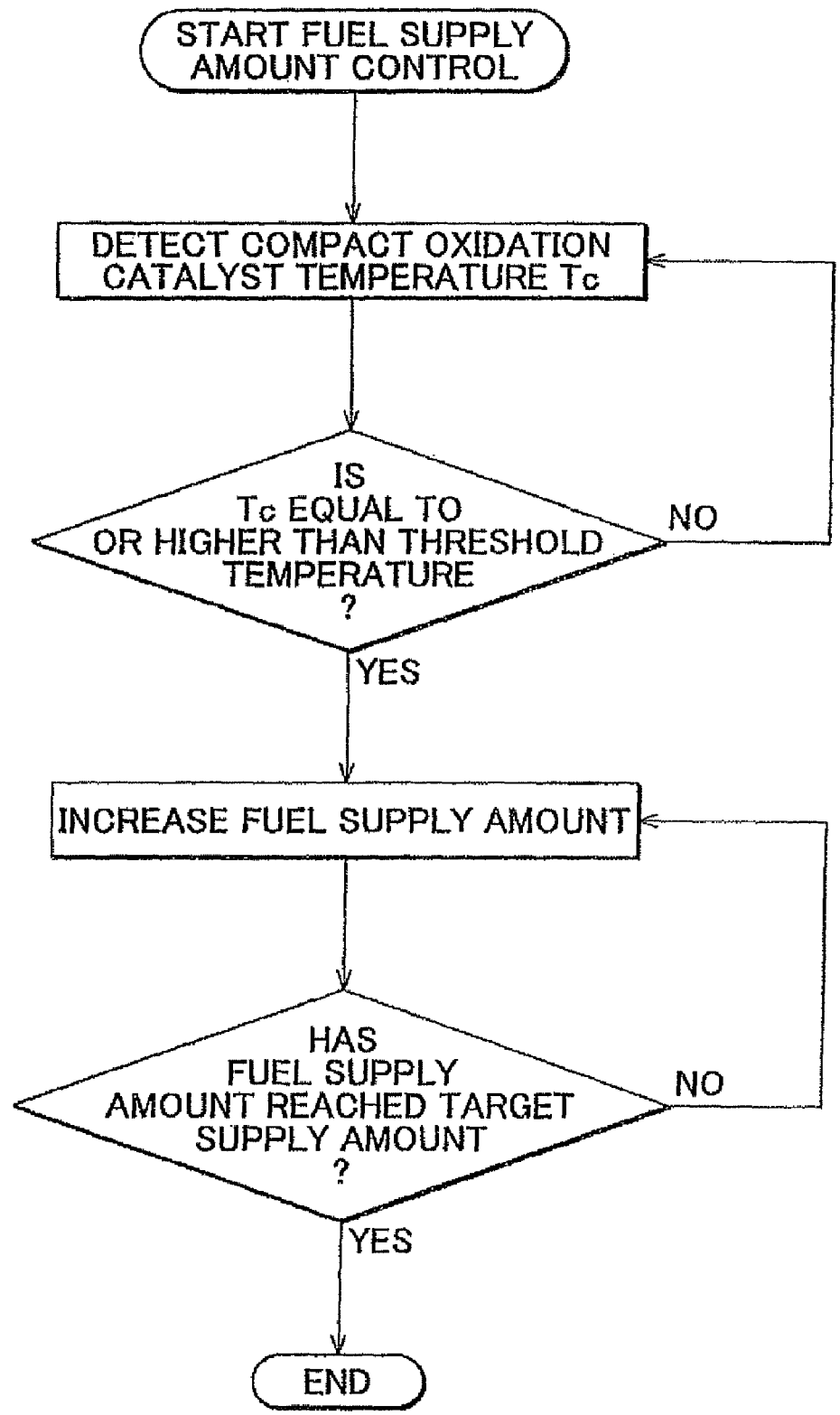
FIG. 17 is a flowchart illustrating the fourth operation example in the second embodiment of the invention.

FIGS. 16 and 17 show the operation example when the exhaust gas control apparatus is operated in the first control mode. FIG. 16 is a time chart when the exhaust gas control apparatus is operated in the first control mode. In the operation example, if the temperature of the compact oxidation catalyst is equal to or higher than a threshold temperature when the exhaust gas control apparatus is operated in the first control mode, a control for increasing the fuel injection amount is executed. As shown in FIG. 1, the temperature of the compact oxidation catalyst may be detected by detecting the temperature of the exhaust gas at the outlet of the compact oxidation catalyst with the use of the temperature sensor 25.

If the temperature of the compact oxidation catalyst reaches the predetermined threshold temperature after the operation in the first control mode is started, the amount of fuel that is injected from the fuel supply valve is increased. For example, the activation temperature Tx for the compact oxidation catalyst may be used as the threshold temperature. That is, in the first control mode, if the temperature of the compact oxidation catalyst reaches the threshold temperature when the fuel is injected in the fuel supply amount $Q_2$, the fuel supply amount is changed to the fuel supply amount $Q_3$ that is larger than the fuel supply amount $Q_2$.

When the temperature of the oxidation catalyst is equal to or higher than the activation temperature, if the temperature of the oxidation catalyst is further increased, the reformation performance of the oxidation catalyst is increased. If the temperature of the oxidation catalyst is increased, the fuel is reformed by both a flame and by the compact oxidation catalyst. Therefore, the amount of fuel injected from the fuel supply valve is increased. As a result, it is possible to supply a large amount of reformed fuel to the exhaust pipe at a portion downstream of the compact oxidation catalyst.

For example, if the oxidation catalyst is provided downstream of the compact oxidation catalyst and the oxidation catalyst has been activated, it is possible to increase the temperature of the exhaust gas in a short time by supplying a large amount of reductants to the oxidation catalyst. Alternatively, it is possible to supply a large amount of reductants to the exhaust gas processing device provided on the downstream side.

FIG. 17 is a flowchart that is used when the exhaust gas control apparatus is operated in the first control mode shown in FIG. 16. First, the temperature Tc of the compact oxidation catalyst is detected. If the temperature of the compact oxidation catalyst is equal to or higher than the threshold temperature, the amount of fuel injected from the fuel supply valve is increased. On the other hand, if the temperature Tc of the compact oxidation catalyst is lower than the threshold temperature, the temperature Tc of the compact oxidation catalyst is detected after a predetermined period.

If the fuel supply amount is increased, it is determined whether the fuel supply amount has reached the target supply amount. If it is determined that the fuel supply amount has not reached the target supply amount, the fuel supply amount is increased again. On the other hand, if it is determined that the fuel supply amount has reached the target supply amount, the control ends.

The amount of increase in the fuel supply amount at a time and the fuel supply amount with respect to the temperature of the compact oxidation catalyst may be set according to maps. The control unit may have a map that defines the relationship between the fuel supply amount and the temperature of the exhaust gas processing device or a map that defines the relationship between the fuel supply amount and the temperature of the compact oxidation catalyst. The amount of increase in the fuel supply amount and the fuel supply amount may be set in any appropriate manner.

Because the other configurations and effects of the second embodiment are the same as those in the first embodiment, they will not be described below.

The embodiments described above may be combined together.

While the invention has been described with reference to example embodiments thereof, it is to be understood that the invention is not limited to the example embodiments or constructions. To the contrary, the invention is intended to cover various modifications and equivalent arrangements. In addition, while the various elements of the example embodiments are shown in various combinations and configurations, which are example, other combinations and configurations, including more, less or only a single element, are also within the scope of the invention.

The invention claimed is:

1. An exhaust gas control apparatus for an internal combustion engine, comprising:
   an exhaust gas processing device that is provided in an engine exhaust passage, and that purifies exhaust gas;
   a compact oxidation catalyst which is provided in the engine exhaust passage at a position upstream of the exhaust gas processing device, which has a cross section that is smaller than a cross section of the engine exhaust passage, and in which part of the exhaust gas flows;
   a fuel supply device that supplies fuel toward the compact oxidation catalyst;
   a heating device that is provided between the compact oxidation catalyst and the fuel supply device and that provides heating; and
   a control unit that controls the fuel supply device and the heating device, wherein
   there are a first operation region where it is possible to ignite the fuel when the fuel is supplied into the exhaust gas by the fuel supply device and the fuel is heated by the heating device, and a second operation region where it is not possible to ignite the fuel when the fuel is supplied into the exhaust gas by the fuel supply device and the fuel is heated by the heating device;
   control modes for the exhaust gas control apparatus include a first control mode where the fuel is supplied from the fuel supply device, the fuel is heated by the heating device, and the fuel is ignited, a second control mode where the fuel is supplied from the fuel supply device, the fuel is heated by the heating device, and the fuel is not ignited, and a third control mode where the fuel is supplied from the fuel supply device and the heating device does not provide heating; and
   the control unit places the exhaust gas control apparatus in the first control mode or the third control mode in the first operation region, and places the exhaust gas control apparatus in the second control mode or the third control mode in the second operation region.

2. The exhaust gas control apparatus according to claim 1, wherein the exhaust gas control apparatus is formed in such a manner that part of a flame that is provided when the fuel is ignited travels through a space between the compact oxidation catalyst and a wall face of the engine exhaust passage.

3. The exhaust gas control apparatus according to claim 1, wherein the control unit controls the fuel supply device in such a manner that the fuel supply device supplies the fuel in a first fuel supply amount during a predetermined period after an operation in the first control mode is started and the fuel supply device supplies the fuel in a second fuel supply amount that is smaller than the first fuel supply amount after the predetermined period has elapsed.

4. The exhaust gas control apparatus according claim 1, wherein when the control mode is switched from the first control mode to the third control mode, the control unit sets a period in which the heating device does not provide heating and the fuel supply device does not supply the fuel between an ending time of the first control mode and a starting time of the third control mode.

5. The exhaust gas control apparatus according to claim 1, further comprising:

an exhaust gas flow rate adjustment device that adjusts a flow rate of the exhaust gas which flows in the engine exhaust passage and that is controlled by the control unit, wherein the control unit controls the exhaust gas flow rate adjustment device in such a manner that the exhaust gas is supplied at a first flow rate during a predetermined period after an operation in the first control mode is started, and the exhaust gas is supplied at a second flow rate that is higher than the first flow rate after the predetermined period has elapsed.

6. The exhaust gas control apparatus according to claim 1, wherein when the exhaust gas control apparatus is operated in the first control mode, the control unit controls the fuel supply device in such a manner that if a temperature of the compact oxidation catalyst is equal to or higher than a predetermined threshold temperature, the fuel supply device supplies the fuel in an amount that is larger than an amount of fuel that is supplied from the fuel supply device when the temperature of the compact oxidation catalyst is lower than the predetermined threshold temperature.

7. The exhaust gas control apparatus according to claim 1, wherein the exhaust gas processing device includes at least one of an oxidation catalyst, a NOx storage catalyst and a particulate filter.

8. The exhaust gas control apparatus according to claim 1, wherein the fuel supply device supplies the fuel intermittently.

9. The exhaust gas control apparatus according to claim 1, wherein:
    a fourth control mode where the fuel supply device does not supply the fuel and the heating device is on is set;
    the exhaust gas control apparatus is operated in the fourth control mode before being operated in the first control mode or the second control mode; and
    when a temperature of the heating device becomes high, the exhaust gas control apparatus is shifted from the fourth control mode to the first control mode or the second control mode.

10. The exhaust gas control apparatus according to claim 1, further comprising:
    a temperature sensor that detects a temperature of the compact oxidation catalyst, wherein
    when the temperature of the compact oxidation catalyst detected by the temperature sensor reaches an activation temperature, the exhaust gas control apparatus is shifted from the first control mode or the second control mode to the third control mode.

* * * * *